US011907999B2

(12) United States Patent
Iyer et al.

(10) Patent No.: US 11,907,999 B2
(45) Date of Patent: *Feb. 20, 2024

(54) SYSTEM, METHOD, AND COMPUTER READABLE MEDIUM FOR AUTOMATIC ITEM RANKINGS

(71) Applicant: Walmart Apollo, LLC, Bentonville, AR (US)

(72) Inventors: Rahul Iyer, Sunnyvale, CA (US); Shashank Kedia, Sunnyvale, CA (US); Anirudha Sundaresan, Sunnyvale, CA (US); Shubham Gupta, Sunnyvale, CA (US); Praveenkumar Kanumala, Newark, CA (US); Stephen Dean Guo, Saratoga, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,269

(22) Filed: Jan. 25, 2023

(65) Prior Publication Data

US 2023/0162266 A1 May 25, 2023

Related U.S. Application Data

(63) Continuation of application No. 17/147,895, filed on Jan. 13, 2021, now Pat. No. 11,610,249.

(51) Int. Cl.
*G06Q 30/00* (2023.01)
*G06Q 30/0601* (2023.01)
(Continued)

(52) U.S. Cl.
CPC ... *G06Q 30/0631* (2013.01); *G06F 16/24578* (2019.01); *G06Q 10/087* (2013.01)

(58) Field of Classification Search
USPC .......................................................... 705/26.7
See application file for complete search history.

(56) References Cited

U.S. PATENT DOCUMENTS 7,376,586 B1    5/2008  Partovi et al.
8,429,026 B1    4/2013  Kolawa et al.
(Continued)

OTHER PUBLICATIONS

Mihalcea, Rada, Courtney Corley, and Carlo Strapparava, Corpus-based and knowledge-based measures of text semantic similarity, Jul. 2006, Aaai. vol. 6. No. 2006, pp. 775-780. (Year: 2006).*

(Continued)

*Primary Examiner* — Allison G Wood
*Assistant Examiner* — Brittany E Bargeon
(74) *Attorney, Agent, or Firm* — Morgan, Lewis & Bockius LLP; Manita Rawat

(57) ABSTRACT

This application relates to apparatus and methods for automatically determining item relevancy based on textual information. In some examples, a computing device receives a search query, and a plurality of items corresponding to the search query. The computing device may identify one or more features of the search query. The computing device may generate relevancy values for each of the items based on the features of the search query, and features of each of the plurality of items. For example, the computing device may generate, for each of the items, a plurality of relevance values, each relevance value generated based on a feature of the search query and corresponding features of the item. The computing device may transmit the generated relevancy values for the plurality of items. In some examples, the computing device may rank the plurality of items based on the generated relevancy values.

20 Claims, 11 Drawing Sheets

(51) Int. Cl.
    *G06Q 10/087*     (2023.01)
    *G06F 16/2457*     (2019.01)

(56) References Cited

U.S. PATENT DOCUMENTS

| | | | |
|---|---|---|---|
| 9,799,328 | B2 | 10/2017 | Aravamudan et al. |
| 10,592,575 | B2 | 3/2020 | Barve et al. |
| 11,610,249 | B2 * | 3/2023 | Iyer ................. G06Q 10/087 |
| 2003/0105682 | A1 | 6/2003 | Dicker et al. |
| 2003/0171944 | A1 | 9/2003 | Fine et al. |
| 2004/0059626 | A1 | 3/2004 | Smallwood |
| 2004/0230440 | A1 | 11/2004 | Malhotra |
| 2008/0071620 | A1 | 3/2008 | Lowe |
| 2009/0281973 | A1 | 11/2009 | Sellinger et al. |
| 2011/0282821 | A1 | 11/2011 | Levy et al. |
| 2012/0084282 | A1 | 4/2012 | Chiang et al. |
| 2012/0311495 | A1 * | 12/2012 | Evers ................. G06F 3/04847 715/810 |
| 2014/0172624 | A1 | 6/2014 | Stoppelman |
| 2015/0112826 | A1 | 4/2015 | Crutchfield, Jr. |
| 2015/0339754 | A1 | 11/2015 | Bloem et al. |
| 2016/0117407 | A1 | 4/2016 | Cypher et al. |
| 2016/0321365 | A1 * | 11/2016 | Duan ................. G06F 16/3346 |
| 2016/0342702 | A1 | 11/2016 | Barve et al. |
| 2017/0300996 | A1 | 10/2017 | Abuelsaad et al. |
| 2017/0300999 | A1 | 10/2017 | Wilkinson et al. |
| 2017/0372400 | A9 | 12/2017 | Levy et al. |
| 2018/0052842 | A1 | 2/2018 | Hewavitharana et al. |
| 2018/0157681 | A1 | 6/2018 | Yang et al. |
| 2019/0108538 | A1 | 4/2019 | Montero et al. |
| 2019/0236680 | A1 | 8/2019 | Kounine et al. |
| 2019/0362409 | A1 | 11/2019 | Srinivasan et al. |
| 2020/0279020 | A1 * | 9/2020 | Bar-on ................. G06F 40/30 |
| 2020/0279556 | A1 | 9/2020 | Gruber et al. |

OTHER PUBLICATIONS

Liang, et al., "Factorization Meets the Item Embedding: Regularizing Matrix Factorization with Item Co-Occurrence," RecSys '16: proceedings of the 10th ACM Conference on Recommender Systems, Sep. 2016, pp. 59-66, <URL: https://dx.doi.org/10.1145/2959100.2959182>. Retrieved from the Internet: <URL: http://www.cs.toronto.edu/lcharlin/papers/cofactorization.pdf> [retrieved on Apr. 20, 2020].

Ruiz, et al., "Shopper: A Probabilistic Model of Consumer Choice with Substitutes and Complements," arXiv:1711.03560v3 [stat.ML], Jun. 9, 2019. Retrieved from the Internet: <URL: https://arxiv.org/pdf/1711.03560.pdf> [retrieved on Apr. 20, 2020].

Wan, et al., "Representing and Recommending Shopping with Complementarity, Compatibility, and Loyalty," CIKM '18: Proceedings of the 27th ACM International Conference on Information and Knowledge Management, Oct. 2018, pp. 1133-1142, <URL: https://doi.org/10.1145/3269206.3271786>. Retrieved from the Internet: <URL: https://www.microsoft.com/en-us/research/uploads/prod/2019/01/cikm18_mwan.pdf> [retrieved on Apr. 20, 2020].

Grbovic, et al., "E-commerce in Your Inbox: Product Recommendations at Scale, " KDD '15: Proceedings of the 21th ACM SIGKDD International Conference on Knowledge Discovery and Data Mining, Aug. 2015, pp. 1809-1818, <URL: http://dx.doi.org/10.114/2783258.2788627>. Retrieved from the Internet: <URL: https://arxiv.org/pdf/1606.07154.pdf> [retrieved on Apr. 20, 2020].

Barkan, et al., "Item2Vec: Newural Item Embedding for Collaborative Filtering," Oct. 2015, <URL: https://arxiv.org/ftp/arxiv/papers/1603.04259.pdf> [retrieved on Apr. 20, 2020].

Hu, et al., "Collaborative Filtering for Implicit Feedback Datasets," ICDM '08: Proceedings on the 2008 Eighth IEEE International Conference on Data Mining, Dec. 2008, pp. 263-272, <URL: https://doi.org/10.1109/ICDM.2008.22>. Retrieved from the Internet: <URL: http://yifanhu.net/PUB/cf.pdf> [retrieved on Apr. 20, 2020].

Sun, et al., "Conversational Recommender System," SIGIR '18: The 41st International ACM SIGIR Conference on Research & Development in Information Retrieval, arXiv:1806.03277v1 [cs.IR], Jun. 2018, pp. 235-244, <URL: https://doi.org/10.1145/3209978.3210002>. Retrieved from the Internet: <URL: https://arxiv.org/pdf/1806.03277.pdf> [retrieved on Apr. 20, 2020].

Dong, et al., "metapath2vec: Scalable Representation Learning for Heterogenous Networks," KDD '17: Proceedings of the 23rd ACM SIGKDD International Conference on Knowledge Discovery and Data Mining, Aug. 2017, pp. 135-144, <URL: https://doi.org/10.114/3097983.3098036>. Retrieved from the Internet: <URL: https://ericdongyx.github.io/papers/KDD17-dong-chawla-swami-metapath2vec.pdf> [retrieved on Apr. 20, 2020].

R. Mihalcea, et al., "Corpus-based and knowledge-based measures of text semantic similarity," Jul. 2006, American Association for Artificial Intelligence, vol. 6, No. 2006, pp. 775-780.

* cited by examiner

SYSTEM, METHOD, AND COMPUTER READABLE MEDIUM FOR AUTOMATIC ITEM RANKINGS

CROSS-REFERENCE TO RELATED APPLICATION

This application is a continuation of U.S. patent application Ser. No. 17/147,895, filed Jan. 13, 2021, which is incorporated herein in its entirety by reference.

TECHNICAL FIELD

The disclosure relates generally to web-based advertising systems and, more specifically, to ranking items based on relevancy determinations.

BACKGROUND

At least some websites, such as retailer websites, advertise items that customers can purchase. For example, the websites may allow a customer to provide search terms through a search box, matches the search terms to items, and displays the items to the customer. In some examples, computing devices, such as smartphones, allow the customer to audibly provide the search terms. For example, a smartphone may have speech recognition capability that generates textual information from human speech. The customer may speak a request to search for items, and the smartphone may generate textual information identifying the request. The websites may then search for items based on the generated textual information. In some examples, to determine the items to advertise, some websites determine items to advertise based on item recommendations received from recommendation systems. The recommendation system may include models that operate on customer information to determine the items to advertise.

Often times, however, the customer is not interested in the advertised items. For example, the advertised items may not satisfy the intentions of the customer's search request. In some examples, a customer may be interested in items that have certain attributes which the advertised items may not share. Further still, an advertised item may be out of stock, and no satisfactory options are provided to the customer. As a result, customers may forgo purchasing items on the website, resulting in sales losses to a retailer. For example, the customer may visit a different website to purchase an intended item. Moreover, the customer may not be as satisfied with the shopping experience as if more relevant items were provided. As such, there are opportunities to improve web-based advertising systems.

SUMMARY

The embodiments described herein are directed to automatically determining item relevancy based on textual information. For example, the textual information may identify a string of characters, such as one or more search terms. In some examples, the textual information is generated based on speech recognition capabilities of a computing device. The embodiments may determine a plurality of items based on the textual information, and generate relevancy values (e.g., scores) for each of the plurality of items. For example, the embodiments may generate a plurality of initial relevancy values for each item (e.g., a brand relevancy score, a size relevancy score, and a count relevancy score), and may generate a final relevancy value for each item based on the item's corresponding initial relevancy values. Further, the embodiments may rank the plurality of items based on the plurality of final relevancy scores. One or more item advertisements may be displayed to a customer based on the ranked plurality of items. For example, assuming two item advertisements are to be displayed to the customer, item advertisements for the two highest ranked items may be displayed to the customer.

As a result, the embodiments may allow a retailer to present more relevant item advertisements to a customer. As a result, the customer may be more likely to purchase an item from the retailer. In addition, presenting customers with more relevant personalized item advertisements may lead to increased sales. Moreover, the embodiments may allow a customer to spend less time searching for an item when presented with more relevant item advertisements, thereby saving the customer time from having to search for items. The time savings may also allow time for a customer to consider additional items for purchase. Additionally, the embodiments may allow the retailer to provide a more pleasant shopping experience to the customer, thereby increasing customer affinity to the retailer. In addition to or instead of these example advantages, persons of ordinary skill in the art would recognize and appreciate other advantages as well.

In accordance with various embodiments, exemplary systems may be implemented in any suitable hardware or hardware and software, such as in any suitable computing device. For example, in some embodiments, a computing device receives text data identifying a plurality of characters. For example, the plurality of characters may include one or more search terms. The computing device may also receive a plurality of item recommendations. The plurality of item recommendations may be item recommendations generated based on the search terms and user session data, such as items clicked, impressions, e.g., items viewed, for the customer. The computing device may identify one or more features based on the text data. For example, the computing device may identify one or more of a brand name, a size, a count, or any other item feature within the plurality of characters. Further, the computing device may generate an initial relevancy score for each of the identified features of each of the plurality of item recommendations. For example, the computing device may generate, for each of the plurality of item recommendations, a brand relevancy value, a size relevancy value, and a count relevancy value, each generated based on the text data and the item's corresponding feature. The computing device may generate a final relevancy value for each of the plurality of item recommendations based on each item's initial relevancy values. Further, the computing device may transmit the relevancy values to a web server to display one or more item advertisements for the plurality of items based on the ranking. In some examples, the computing device ranks the plurality of item recommendations based on the final relevancy values, and transmits the ranked items.

In some embodiments, a computing device is configured to receive a search query. The computing device is also configured to determine at least one requested item feature based on the search query. Further, the computing device is configured to obtain, for each of a plurality of recommended items, a plurality of recommended item features. The computing device is also configured to determine, for each of the plurality of recommended items, a plurality of relevancy values, each of the plurality of relevancy values generated based on a corresponding item feature of the plurality of recommended item features and the at least one requested item feature. In some examples, the computing device is configured to transmit the plurality of relevancy values.

In some examples, the computing device is configured to determine, for each of the plurality of recommended items, a final relevancy value based on the corresponding plurality of relevancy values. The computing device is also configured to store the final relevancy values in a data repository. In some examples, the computing device is configured to transmit the final relevancy values. For example, the computing device may transmit the final relevancy values to a web server. The web server may, for example, display on a website to the customer one or more advertisements for the plurality of recommended items based on the final relevancy values.

In some embodiments, a method is provided that includes receiving a search query, and determining at least one requested item feature based on the search query. Further, the method includes obtaining, for each of a plurality of recommended items, a plurality of recommended item features. The method further includes determining, for each of the plurality of recommended items, a plurality of relevancy values, each of the plurality of relevancy values generated based on a corresponding item feature of the plurality of recommended item features and the at least one requested item feature. In some examples, the method includes transmitting the plurality of relevancy values.

In some examples, the method includes determining, for each of the plurality of recommended items, a final relevancy value based on the corresponding plurality of relevancy values. The method also includes storing the final relevancy values in a data repository. In some examples, the method includes transmitting the final relevancy values.

In yet other embodiments, a non-transitory computer readable medium has instructions stored thereon, where the instructions, when executed by at least one processor, cause a computing device to perform operations that include receiving a search query, and determining at least one requested item feature based on the search query. Further, the operations include obtaining, for each of a plurality of recommended items, a plurality of recommended item features. The operations further include determining, for each of the plurality of recommended items, a plurality of relevancy values, each of the plurality of relevancy values generated based on a corresponding item feature of the plurality of recommended item features and the at least one requested item feature. In some examples, the operations include transmitting the plurality of relevancy values.

In some examples, the operations include determining, for each of the plurality of recommended items, a final relevancy value based on the corresponding plurality of relevancy values. The operations also include storing the final relevancy values in a data repository. In some examples, the operations transmitting the final relevancy values.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
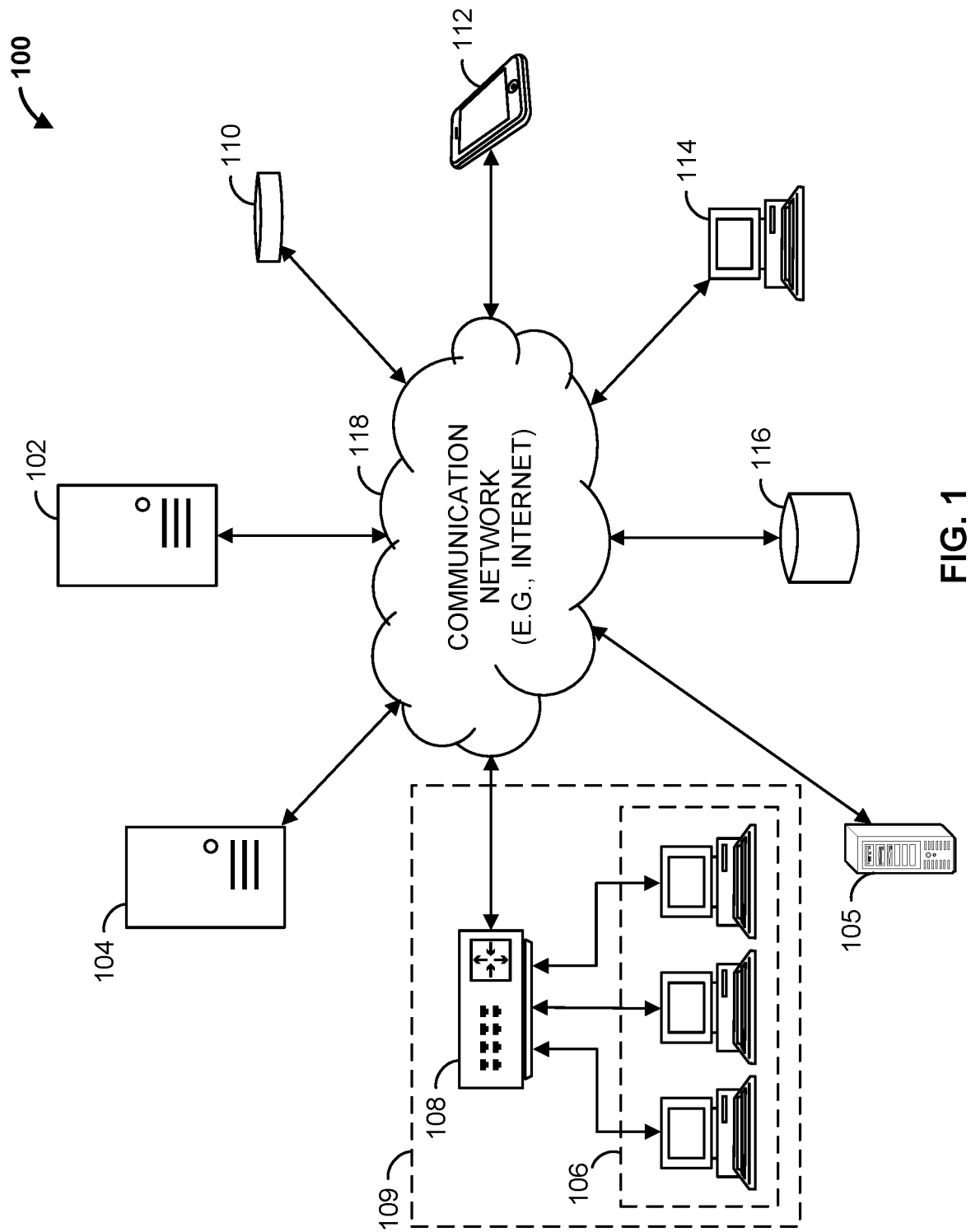
FIG. 1 is a block diagram of an advertisement system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of an advertisement system 100 that includes an relevancy score computing device 102 (e.g., a server, such as an application server), a web server 104, workstation(s) 106, database 116, an item recommendation system 105, and multiple customer computing devices 110, 112, 114 operatively coupled over network 118.

Relevancy score computing device 102, workstation(s) 106, web server 104, item recommendation system 105, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, relevancy score computing device 102 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, relevancy score computing device 102, item recommendation system 105, and web server 104 are operated by a retailer, and multiple customer computing devices 112, 114 are operated by customers of the retailer.

Although FIG. 1 illustrates three customer computing devices 110, 112, 114, advertisement system 100 can include any number of customer computing devices 110, 112, 114. Similarly, advertisement system 100 can include any number of workstation(s) 106, relevancy score computing devices 102, web servers 104, item recommendation systems 105, and databases 116.

Workstation(s) 106 is operably coupled to communication network 118 via router (or switch) 108. Workstation(s) 106 and/or router 108 may be located at a store 109, for example. Workstation(s) 106 can communicate with relevancy score computing device 102 over communication network 118. The workstation(s) 106 may send data to, and receive data from, relevancy score computing device 102. For example, the workstation(s) 106 may transmit purchase data related to orders purchased by customers at store 109 to relevancy score computing device 102. The purchase data may include, for example, one or more of a price, description, identification number (e.g., Universal Product Number), quantity, brand, size, and option of each item purchased. In some examples, relevancy score computing device 102 may generate relevancy values for items indicated in the received purchase data. In some examples, relevancy score computing device 102 may transmit to workstation 106, in response to received purchase data, an indication of one or more item advertisements based on the relevancy values, where the item advertisements are provided to a customer. For example, the item advertisements may be displayed on a receipt handed to the customer for the purchase order.

In some examples, web server 104 hosts one or more websites, such as a retailer's website. Customers, via one or more customer computing devices 110, 112, 114, may access the website, which may allow customers to purchase items. For example, the website may advertise items for sale. The website may allow customers to add items to an online shopping cart, and purchase the items within the online shopping cart. The website may further allow the customer to provide a search query, such as within a search bar, to search for items. In some examples, the customer's computing device (e.g., customer computing device 110, 112, 114) includes speech recognition capability, and generates textual information based on generated from the customer's speech. The customer's computing device may package the textual information as a search query, and transmit the search query to web server 104.

Web server 104 may determine one or more items to display (e.g., advertise) to the customer based on the received search query. For example, web server 104 may identify the customer, and may provide customer data, such as customer session data and/or customer purchase data, for the customer to item recommendation system 105. Customer session data may identify, for example, item engagements (e.g., item and advertisement clicks, item and advertisement impressions, add-to-cart (ATC) events, etc.), and search queries, for a customer (e.g., caused by the customer's engagement with the website). Customer purchase data may identify, for example, items purchased, include information about each item purchased (e.g., price, quantity, brand, size, options, description, etc.). In response to receiving the customer data, item recommendation system 105 may determine one or more items to advertise to the customer. In some examples, the items are ranked. Item recommendation system 105 may transmit the items to advertise to web server 104.

Web server 104 may provide the search query, and the recommended items received from item recommendation system 105, to relevancy score computing device 102. Once received, relevancy score computing device 102 may determine features for each of the recommended items, and may generate relevancy scores based on the search query and the features for each of the recommended items. Relevancy score computing device 102 may transmit the relevancy scores to web server 104. Web server 104 may display item advertisements for the recommended items based on the relevancy scores. In some examples, relevancy score computing device 102 ranks the recommended items based on the generated relevancy scores, and transmits the ranked recommended items to web server 104. Web server 104 may display item advertisements for the recommended items based on the ranking.

Relevancy score computing device 102 is operable to communicate with database 116 over communication network 118. For example, relevancy score computing device 102 can store data to, and read data from, database 116. Database 116 can be a remote storage device, such as a cloud-based server, a disk (e.g., a hard disk), a memory device on another application server, a networked computer, or any other suitable remote storage. Although shown remote to relevancy score computing device 102, in some examples, database 116 can be a local storage device, such as a hard drive, a non-volatile memory, or a USB stick. Database 116 may store, for example, customer purchase data and/or customer session data. Database 116 may also store catalog data, which may identify one or more features for each of a plurality of items, such as items sold at store 109 and/or a website hosted by web server 104.

Communication network 118 can be a WiFi network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

In some examples, relevancy score computing device 102 receives text data identifying a plurality of characters from web server 104. For example, the plurality of characters may include one or more search terms. Relevancy score computing device 102 may also receive a plurality of item recommendations from web server 104 (which may have been generated by item recommendation system 105). The plurality of item recommendations may be item recommendations generated by item recommendation system 105 based on the search terms and user session data, such as items clicked, impressions, e.g., items viewed, for the customer. Relevancy score computing device 102 may identify one or more features based on the text data. For example Relevancy score computing device 102 may identify one or more of a brand name, a size, a count, or any other item feature within the plurality of characters. Further, Relevancy score computing device 102 may generate an initial relevancy score for each of the identified features of each of the plurality of item recommendations. For example, relevancy score computing device 102 may generate, for each of the plurality of item recommendations, a brand relevancy value, a size relevancy value, and a count relevancy value, each relevancy value generated based on the text data and the item's corresponding feature, as described herein. Further, relevancy score computing device 102 may generate a final relevancy value for each of the plurality of item recommendations based on each item's initial relevancy values. Further, relevancy score computing device 102 may transmit the relevancy values to web server 104 to display one or more item advertisements for the plurality of items based on the ranking.

In some embodiments, relevancy score computing device 102 receives a search query from web server 104, and determines at least one feature, such as a brand, size, or count, based on the search query. Further, relevancy score computing device 102 may obtain, for each of a plurality of recommended items, a plurality features. For example, relevancy score computing device 102 may receive the plurality of recommended items from item recommendation system 105, and may obtain, from database 116, a plurality of features, such as a brand, a size, and a count, for each of the plurality of recommended items.

Relevancy score computing device 102 may determine, for each of the plurality of recommended items, a plurality of relevancy values. The plurality of relevancy values may be generated based on one or more corresponding features of each item, and the features determined based on the search query. For example, relevancy score computing device 102 may generate an item relevance value for the item based on a similarity between a feature of the item, and a feature of the search query. In some examples, relevancy score computing device 102 may generate the item relevance value according to the equation below.

$$\log P(q\sim i)=\Sigma_j \alpha_j \log P(f_{qj}\sim f_{ij}) \quad \text{(eq. 1)}$$

where:
a~b is similarity between a and b;
$a_j$ is the weight for $j^{th}$ feature;
$f_{ij}$ is the $j^{th}$ feature of item i;
$f_{qj}$ is the $j^{th}$ feature of query q; and
Log P(x) is the log likelihood of event x.

In some examples, relevance score computing device 102 generates an item relevance value based on computing a proxy similarity score, such as according to the below equations.

$$\log P(f_{qj}\sim f_{ij})=k_j \times \text{Score}(f_{qj}\sim f_{ij}) \quad \text{(eq. 2)}$$

where $k_j$ is a constant.

Defining a weight $w_j$ for each feature as $w_j=k_j \times \alpha_j$; (eq. 3), relevancy score computing device 102 may generate an item relevance value indicating how relevant an item is to a search query according to the equation below.

$$\text{Score}(q\sim i)=\Sigma_j w_j \text{Score}(f_{qj}\sim f_{ij}) \quad \text{(eq. 4)}$$

In some examples, relevance score computing device 102 determines if an item is relevant based on the item relevance value. For example, relevance score computing device 102 may determine if an item i is relevant to a search query q according to the equation below.

$$\text{Score}(q\sim 1)>t \quad \text{(eq. 5)}$$

where t is a predefined threshold.

If the above equation is satisfied (e.g., the Score is greater than to the threshold t), then item i is relevant for query q. Relevance score computing device 102 may set item relevance value to a predefined value, such as 1. If the above equation is not satisfied, (e.g., the Score is less than or equal to the threshold t), then item i is not relevant for query q. Relevance score computing device 102 may set item relevance value to a predefined value, such as 0.

In some examples, the weight $w_j$ is determined from search query data (e.g., previous search queries) and item engagement data (e.g., items clicked, added to cart, or purchased from the previous search queries). For example, the weights may be computed by determining, for a given search query, a change of attribute values in a top number of the search results (e.g., 5) added to an online shopping cart amongst a plurality of customers. For example, assuming a search query of "great value 2% milk," a determination may be made as to how many customers added an item to their online shopping cart an item that includes the term "milk" (in the item's description), and how many customers did not add an item that includes the term "milk." If, for example, 9 out of 10 customers added a "milk" item to their online shopping cart (after entering the above search term), the weight is 9/10 (e.g., 90%). As another example, a determination may be made as to how many customers added to their online shopping cart an item that includes the term "2%" (e.g., in its description), and how many customers did not add an item that includes the term "2%." If, for example, 1 out of 5 added an item that includes the term "2%" to their online shopping cart (after entering the above search term), the weight is ⅕ (e.g., 20%).

In some examples, relevance score computing device 102 may, additionally or alternately, determine whether a feature is relevant based on each item's title and the search query (e.g., "character-based" relevance). For example, relevance score computing device 102 may first normalize each item's title and the search query (e.g., by performing one or more of stemming and lemmatization, stopword removal, and spellcheck operations). Relevance score computing device 102 may then determine a Levenshtein distance between the normalized title and search query. For example, relevance score computing device 102 may determine the Levenshtein distance according to the equation below.

$$\text{Levenshtein distance between strings 'a' and 'b'} = \frac{\text{number of modifications required}}{\max(\text{Length of string } a, \text{Length of string } b)}; \quad \text{(eq. 6)}$$

In some examples, relevance score computing device 102 then determines a text similarity between the words in the normalized title of each item and the normalized search query based on computing a Jaccard distance. For example, relevance score computing device 102 may determine the Jaccard distance according to the equation below.

$$\text{Jaccard distance } (A, B) = \frac{|S_A \cap S_B|}{|S_A \cup S_B|} \quad \text{(eq. 7)}$$

In some examples, relevance score computing device 102 determines the text similarity between the normalized title of each item and the normalized search query based on computing a modified Jaccard distance according to the equation below.

$$\text{modified Jaccard distance } (A, B) = \frac{|S_A \cap S_B|}{|S_A|} \quad \text{(eq. 8)}$$

In some examples, relevance score computing device 102 further determines a character similarity between the normalized title of each item and the normalized search query by removing spaces and special characters from each of the normalized title and the normalized search query, and computing a Levenshtein distance between them.

Relevance score computing device 102 may then determine a character relevance value for the corresponding item based on the text similarity and the character similarity. For example, relevance score computing device 102 may determine whether any of the text similarity and the character similarity exceed a corresponding threshold. If either of the text similarity and the character similarity exceed their corresponding threshold, relevance score computing device 102 may generate a character relevance value indicating that the item is relevant (e.g., 1). If none of the text similarity and the character similarity exceed their corresponding threshold, relevance score computing device 102 may generate a character relevance value indicating that the item is not relevant (e.g., 0).

In some examples, relevance score computing device 102 determines whether the item is relevant based on the character relevance value. For example, relevance score computing device 102 may determine that the item is relevant if its corresponding character relevance value is above a threshold, and may store data indicating such determination in database 116 (e.g., (e.g., character relevance value=1 if relevant, (e.g., character relevance value=0 if not relevant). In some examples, relevance computing device 102 determines that the item is relevant if either the character relevance value, or the item relevance value, is above a corresponding threshold.

In some examples, relevance score computing device 102 determines feature relevancy values based on an item's corresponding feature and a feature extracted from the search query. For example, relevance score computing device 102 may determine whether there is a "match" between the item's corresponding feature and the extracted feature. For example, relevance score computing device 102 may extract a brand feature from the search query, and determine if it matches the item's brand. In some examples, relevance score computing device 102 determines the match based on a hierarchical graph, as described herein.

In some examples, relevance score computing device 102 determines feature relevancy values based on determining similarities between values extracted from the search query and item values. For example, relevance score computing device 102 may determine a size and/or count relevancy value based on identifying a unit (e.g., fluid ounce, extra large, liter, etc.) of the values, converting the values to a common denomination, and normalizing the values. Further, relevance score computing device 102 may determine the relevance between the values based on determining an error value between the values. For example, the error value may be computed according to the equation below.

$$|A-B| < \varepsilon \qquad (\text{eq. 9})$$

where:
  A is an item size or count;
  B is a search query size or count; and
  ε is a threshold.

For example, a difference between an item size/count corresponding to the search query and an item size/count corresponding to an item is computed. If the absolute value of the difference is less than a threshold, then the item may be deemed relevant (e.g., item size/count relevance value of 1). Otherwise, if the absolute value of the difference is not less than the threshold, the item may be deemed not relevant (e.g., item size/count relevance value of 0).

In some examples, relevance score computing device 102 transmits one or more of the determined relevancy values for each of the plurality of items to web server 104. For example, relevance score computing device 102 may transmit, for each of the plurality of items received from web server 104, a character relevancy value, and one or more feature relevancy values, such as a brand relevancy value, a count relevancy value, and a size relevancy value. Web server 104 may then determine what item(s) to advertise based on the received relevancy values.

For example, a customer may operate customer computing device 112 to browse (e.g., via a browser application) a website hosted by web server 104. The customer computing device may include speech recognition, and convert audio received via a microphone to text data, and include the text data within a search query transmitted to web server 104. For example, the customer may say "add brand aaa facial cleanser 6.7 fluid ounces to cart," which is converted to text data by customer computing device 112. Further, customer computing device 112 may generate and transmit a search query to web server 104 that includes the text of "add brand aaa facial cleanser 6.7 fluid ounces to cart." Web server 104 may transmit a request to item recommendation system 105, which may include the search query and customer session data and/or customer purchase data for the customer, and may receive, in response, a list of recommended items to display to the customer in response to the search query.

Further, web server 104 may provide the list of recommended items, and the search query, to relevance score computing device 102, and, in response, relevance score computing device 102 may compute one or more relevancy values for each of the recommended items. For example, relevance score computing device 102 may compute a character relevancy value, a brand relevancy value, a size relevancy value, and a count relevancy value, for each of the recommended items, as described herein. Based on the relevancy values for each of the items, web server 104 may determine a response to transmit to customer computing device 112. For example, if one of the items has a brand relevancy value indicating a close (e.g., exact) match to brand "aaa," and further has a size relevancy value indicating a close match to "6.7 fluid ounces," web server 104 may provide a response indicating, for example, that "brand x radiant facial cleaner 6.7 fluid ounces is available."

In continuing the above example, assume the customer then provides a search query that asks for a different brand (e.g., "can I have a different brand?"). Web server 104 may then identify an item out of the list of recommended items with a high item relevancy value (e.g., 1), but a low brand relevancy value (e.g., 0). Web server 104 may then generate a response to transmit to customer computing device 112, such as "brand bee foaming facial cleaner 6.7 fluid ounces" is available. Assuming the customer wishes to purchase this item, the customer may provide an indication to add the product to the websites shopping cart, such as "add it to cart," which is transmitted by customer computing device 112 to web server 104. Web server 104 may then add the "brand bee foaming facial cleaner 6.7 fluid ounces" to the customer's online shopping cart and, in some examples, may provide a response that indicates the item has been added (e.g., "brand bee foaming facial cleaner 6.7 fluid ounces added to cart").

In some examples, relevance score computing device 102 determines, for each of the plurality of recommended items, a final relevancy value based on the relevancy values corresponding to each item. For example, relevance score computing device 102 may apply an algorithm to the relevancy values (e.g., item relevancy value, character relevancy value, brand relevancy value, size relevancy value, and count relevancy value) to generate the final relevancy value for the item.

Relevance score computing device 102 may store the final relevancy values in database 116, and may transmit the final relevancy values to web server 104. Web server 104 may, for example, display on a website to the customer one or more advertisements for the plurality of recommended items based on the final relevancy values.

Figure 2:
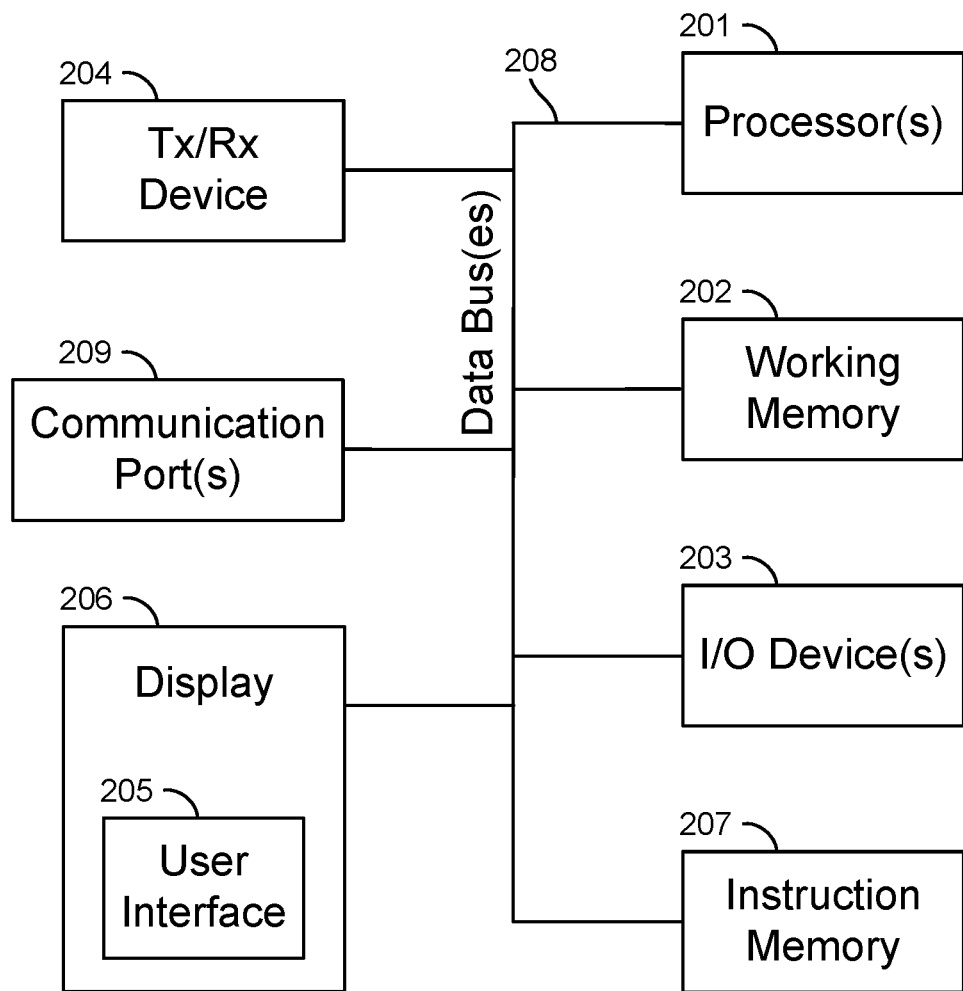
FIG. 2 is a block diagram of the relevancy score computing device of the advertisement system of FIG. 1 in accordance with some embodiments.

FIG. 2 illustrates the relevancy score computing device 102 of FIG. 1. Relevancy score computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more processing cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of relevancy score computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allows for the transfer (e.g., uploading or downloading) of data, such as the uploading of executable instructions to be executed by processor 201 and stored in instruction memory 207.

Display 206 can display user interface 205. User interfaces 205 can enable user interaction with relevancy score computing device 102. For example, user interface 205 can be a user interface for an application of a retailer that allows the retailer to select machine learning models to be applied to user session data received from web server 104, such as user session data received for customers accessing a retailer's website hosted by web server 104. In some examples, a user can interact with user interface 205 by engaging input-output devices 203. In some examples, display 206 can be a touchscreen, where user interface 205 is displayed by the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 relevancy score computing device 102 will be operating in. Processor(s) 201 is operable to receive data from, or send data to, a network, such as communication network 118 of FIG. 1, via transceiver 204.

Figure 3:
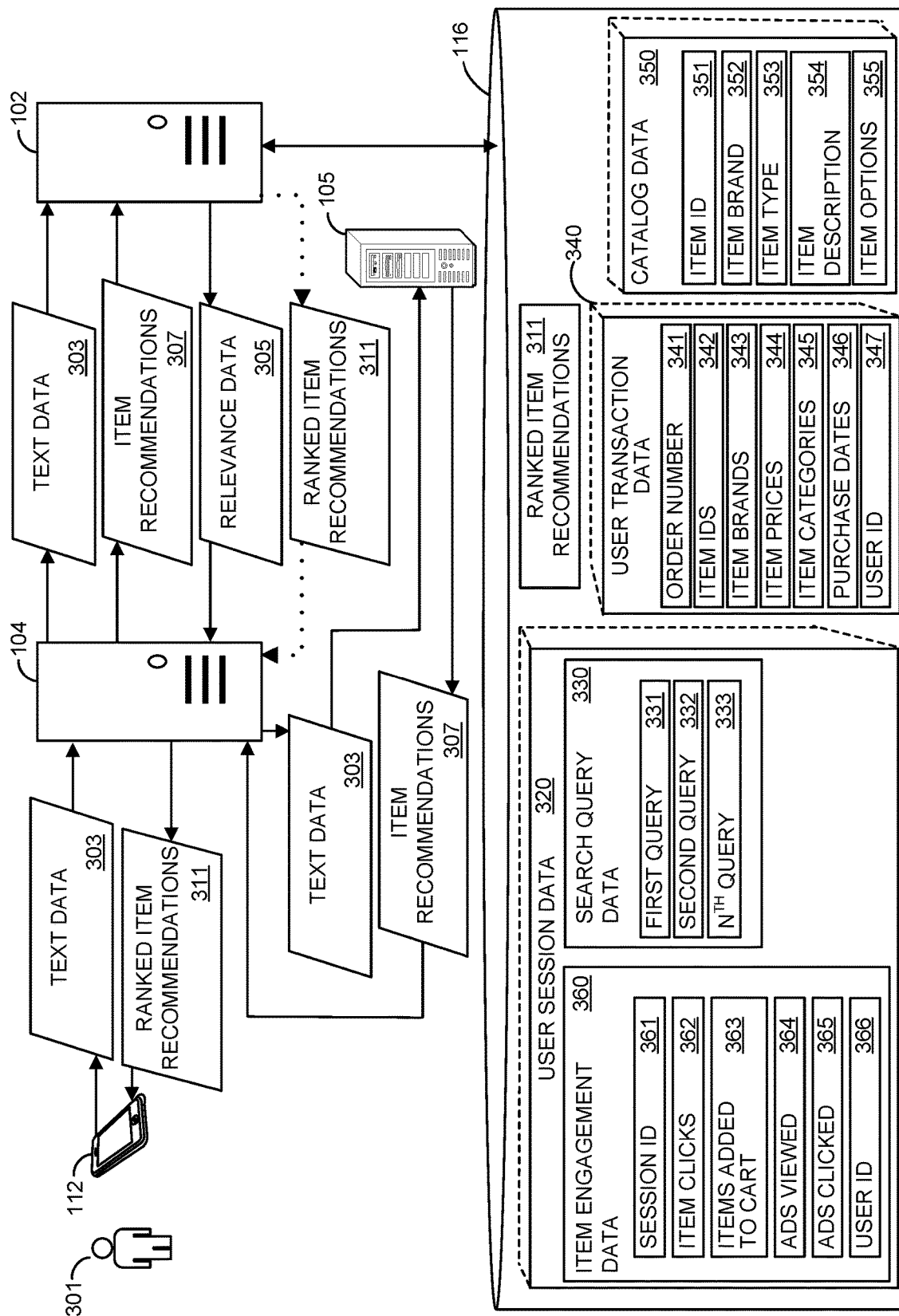
FIG. 3 is a block diagram illustrating examples of various portions of the advertisement system of FIG. 1 in accordance with some embodiments.

FIG. 3 illustrates various portions of the advertisement system 100 of FIG. 1. In this example, web server 104 hosts a website, such as a retailer's website, that customers, such as customer 301, may access via computing devices, such as customer computing device 112. Web server 104 may identify user session data 320 and user transaction data 340 for each customer 301 that access the website, and may store user session data 320 and user transaction data 340 within database 116.

User session data 320 may include, for example, item engagement data 360 and search query data 330. Item engagement data 360 may include one or more of a session ID 361 (i.e., a website browsing session identifier), item clicks 362 identifying items which the user clicked (e.g., images of items for purchase, keywords to filter reviews for an item), items added-to-cart 363 identifying items added to the user's online shopping cart, advertisements viewed 364 identifying advertisements the user viewed during the browsing session, advertisements clicked 3365 identifying advertisements the user clicked on, and user ID 366 ID (e.g., a customer ID, retailer website login ID, etc.). Search query data 330 identifies one or more searches conducted by a user during a browsing session (e.g., a current browsing session). In this example, search query data 330 includes first query 331, second query 3332, and $N^{th}$ query 333.

User transaction data 340 may include, for each purchase, one or more of an order number 341 identifying a purchase order, item IDs 342 identifying one or more items purchased in the purchase order, item brands 343 identifying a brand for each item purchased, item prices 344 identifying the price of each item purchased, item category 345 identifying a category of each item purchased, a purchase date 346 identifying the purchase date of the purchase order, and user ID 347 for the user making the corresponding purchase (which, in some examples, may be the same as user ID 366 for a same customer).

Database 116 may further store catalog data 350, which may identify one or more features of a plurality of items, such as a portion of or all items a retailer carries. Catalog data 350 may identify, for each of the plurality of items, an item ID 351 (e.g., an SKU number), item brand 352, item type 353 (e.g., grocery item such as milk, clothing item), item description 354 (e.g., a description of the product including product features, such as ingredients, benefits, use or consumption instructions, or any other suitable description), and item options 355 (e.g., item size, count, color, flavor, etc.).

As indicated in the figure, customer 301 may operate customer computing device 112 to access the website hosted by web server 104. The customer 301 may provide input to customer computing device 112, which is converted to text data 303 and transmitted to web server 104. Text data 303 may identify a string of characters, which may represent a search query, for example. In some examples, text data 303 may identify text entered within a search bar of the website, for example. Web server 104 may transmit text data 303 to item recommendation system 105 to obtain item recommendations 307 (e.g., a list of recommended items) to display to customer 301. In some examples, web server 104 also transmits portions of user session data 320 and/or portions of user transaction data 340 to item recommendation system 105. Item recommendation system 105 may, for example, apply one or more machine learning models to text data 303 and/or user session data 320 and/or user transaction data 340 to generate the item recommendations 307. Item recommendation system 105 transmits item recommendations 307 to web server 104.

Web server 104 may transmit the text data 303 and item recommendations 307 to relevancy score computing device 102. In response, relevancy score computing device 102 may generate one or more relevancy values based on the text data 303 and features corresponding to each of the items identified within item recommendations 307. For example, for each item identified within item recommendations 307, relevancy score computing device 102 may obtain one or more features based on catalog data 310. As an example, relevancy score computing device 102 may obtain from database 116 a brand 352, and item options 355, such as a size and count, for each item. As another example, relevancy score computing device 102 may obtain from database 116, and for each item, an item ID 342, an item type 353, an item brand 352, and item options 355, such as a flavor or nutrient information (e.g., calories, vitamins, amount of protein, carbohydrates, or fats, etc.).

Relevancy score computing device 102 may generate, for each item, one or more of a character relevancy value, brand relevance value, size relevance value, and count relevancy value, as described herein. Relevancy score computing device 102 generates relevance data 305 identifying one or more of the generated relevancy values for each of the items (identified within item recommendations 307), and transmits relevance data 305 to web server 104. In some examples, web server 104 generates ranked item recommendations 311, which identifies one or more item advertisements for one or more of the items identified within item recommendations 307, based on relevance data 305.

Optionally, relevancy score computing device 102 determines a final relevancy value based on one or more of the item relevancy value, character relevancy value, brand relevance value, size relevance value, and count relevancy value, as described herein. In some examples, relevancy score computing device 102 applies a corresponding weight to each of the one or more of the item relevancy value, character relevancy value, brand relevance value, size relevance value, and count relevancy value to generate the final relevancy value for the item. Relevancy score computing device 102 may rank the items identified within item recommendations 307 based on the final relevancy values to generate ranked item recommendations 311, and may transmit ranked item recommendations 311 to web server 104. Web server 104 may then display one or more advertisements for the items identified within item recommendations 307 based on ranked item recommendations 311. For example, web server 104 may display on the website an advertisement for a first item that is ranked higher than a second item before (or ahead of) displaying an advertisement for the second item. As such, the order of item advertisements may be more relevant to the customer 301 based on the text data 303 received from customer computing device 112.

Figure 4:
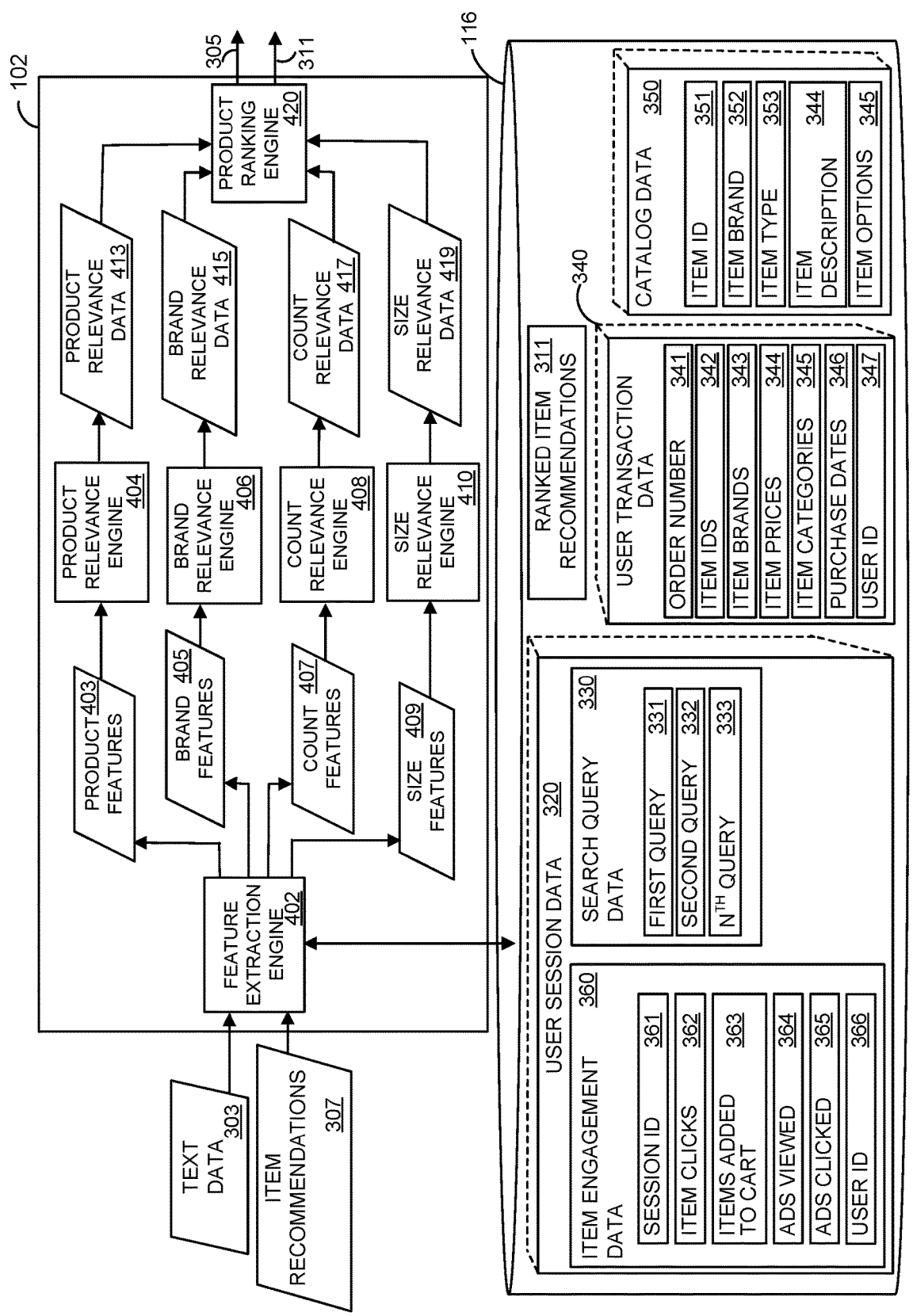
FIG. 4 is a block diagram illustrating examples of various portions of the advertisement system of FIG. 1 in accordance with some embodiments.

FIG. 4 illustrates various portions of the advertisement system 100 of FIG. 1. As illustrated, relevancy score computing device 102 includes feature extraction engine 402, product relevance engine 404, brand relevance engine 406, count relevance engine 408, size relevance engine 410, and product ranking engine 420. In some examples, one or more of feature extraction engine 402, product relevance engine 404, brand relevance engine 406, count relevance engine 408, size relevance engine 410, and product ranking engine 420 may be implemented in hardware. In some examples, one or more of feature extraction engine 402, product relevance engine 404, brand relevance engine 406, count relevance engine 408, size relevance engine 410, and product ranking engine 420 may be implemented as an executable program maintained in a tangible, non-transitory memory, such as instruction memory 207 of FIG. 2, that may be executed by one or processors, such as processor 201 of FIG. 2.

Feature extraction engine 402 receives text data 303 and item recommendations 307 (e.g., from web server 104), and determines features for each of product relevance engine 404, brand relevance engine 406, count relevance engine 408, and size relevance engine 410. Item recommendations 307 may identify a plurality of items (e.g., by item ID 372). Feature extraction engine 402 obtains features from catalog data 310 for each of the items based on features that each of product relevance engine 404, brand relevance engine 406, count relevance engine 408, and size relevance engine 410 operate on. Specifically, feature extraction engine 402 generates product features 403, brand features 405, count features 407, and size features 404, and provides them to product relevance engine 404, brand relevance engine 406, count relevance engine 408, and size relevance engine 410, respectively. Feature extraction engine 402 may also provide text data 303 to one or more of product relevance engine 404, brand relevance engine 406, count relevance engine 408, and size relevance engine 410 as needed by each engine.

Product relevance engine 404 may perform operations to generate product relevance data 413, which may identify an item relevance value for each of the item recommendations 307. For example, product relevance engine 404 may generate an item relevance value for each item in accordance with equation 4, where the weights may have been predetermined as described herein. In some examples, product relevance data 413 identifies whether each item is relevant. For example, product relevance engine 404 may determine whether each item is relevant based on equation 5. For example, for each item, product relevance data 413 may identify relevant (e.g., item relevance value=1), or not relevant (e.g., item relevance value=0).

Figure 5:
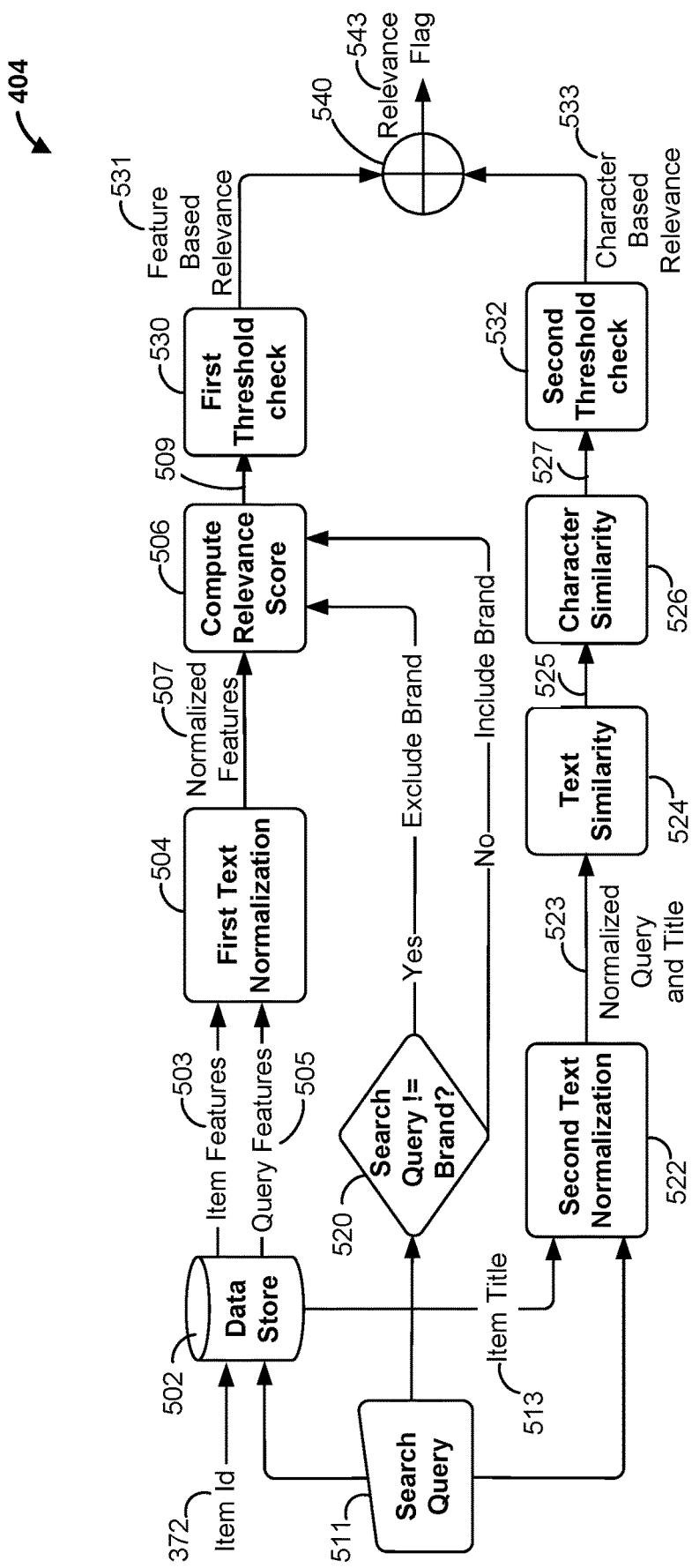
FIG. 5 is a block diagram of an example product relevance engine in accordance with some embodiments.

FIG. 5 illustrates an example of product relevance engine 404. In this example, product relevance engine 404 receives a search query 511, which may be received within text data 311 from customer computing device 112, for example. Search query 511 may include a string of characters identifying a command (e.g., "add brand bee soap to cart," "search for brand bee soap ten ounces") or question (e.g., "is brand bee soap ten ounces available?," "can I have a different brand?"), for example. Product relevance engine 404 may also receive an item ID 372 for one or more items. For example, the item ID 372 may be received within item recommendations 307 from web server 104. The item ID 372 and search query 511 may each be stored within data store 502, which may be database 116 of FIG. 1 in some examples.

First text normalization 504 may obtain item features 503 and query features 505 from data store 502. The item features 503 correspond to features for the item identified by item ID 372, and the query features 505 correspond to features of search query 511. First text normalization 504 normalizes terms, such as words and sentences, in text identified by item features 503 and query features 505. For example, first text normalization 504 may apply stemming and/or lemmatization to the terms. First text normalization 504 may also remove stopwords (e.g., unimportant words such as "a," "an," "of," etc.), and may further identify and correct misspellings (e.g., a spell checker). First text normalization 504 generates normalized features 507, which include the normalized item features 503 and normalized query features 505.

Compute relevance score 506 may generate a first item relevance score 509 based on the normalized features 507. For example, compute relevance score 506 may compute the first item relevance score 509 in accordance with equation 4 above.

First threshold check 530 may generate feature based relevance 531 identifying whether the item identified by item ID 372 is relevant based on the first item relevance score 509. For example, first threshold check 530 may determine that the item is relevant when first item relevance score 509 is beyond (e.g., at or above) a threshold. Otherwise, if first threshold check 530 is not beyond the threshold, first threshold check 530 may determine that the item is not relevant. In some examples, first threshold check 530 determines whether the item is relevant in accordance with equation 5. First threshold check 530 may generate feature based relevance 531 to include one value (e.g., 1) if the item is relevant, and another value (e.g., 0) if the item is not relevant.

Second text normalization 522 obtains an item title 513 for the item corresponding to item ID 372 from data store 502, as well as search query 511. Second text normalization 522 performs similar functions as first text normalization. For example, second text normalization 522 may normalize terms, such as words and sentences, in text identified by item title 513 and search query 511. For example, second text normalization 522 may apply stemming and/or lemmatization to the terms. Second test normalization 522 may also remove stopwords and identify and correct misspellings. Second text normalization 522 generates normalized query and title 523, which includes the normalized item title 513 and normalized search query 511.

Text similarity 524 performs operations to determine text similarities between the normalized item title 513 and normalized search query 511. For example, text similarity 524 may determine a Levenshtein distance between the normalized item title 513 and normalized search query 511 (e.g., a value indicating how many additions, deletions, and/or substitutions are required to convert one string to another). For example, text similarity 524 may determine the Levenshtein distance between the normalized item title 513 and normalized search query 511 in accordance with equation 6.

In some examples, text similarity 524 determines, additionally or alternatively, a similarity between lists (e.g., a number of words) identified by the normalized item title 513 and normalized search query 511. For example, text similarity 524 may determine a modified Jaccard distance between lists identified by the normalized item title 513 and normalized search query 511 according to equation 8.

Text similarity 524 generates text similarity value 525 identifying the similarity between the lists of the normalized item title 513 and normalized search query 511. In some examples, text similarity 524 generates text similarity value 525 based on one or more of a computed Levenshtein distance and a computed modified Jaccard distance. For example, text similarity may add the Levenshtein distance and the modified Jaccard distance. In some examples, text similarity mad apply a weight to each of the Levenshtein distance and the modified Jaccard distance, and then add the results to generate text similarity value 525.

Character similarity 526 may, in some examples, remove spaces and special characters from each of the normalized item title 513 and the normalized search query 511, thereby treating each string as a single word. Further, character similarity 526 may determine a character similarity value 527 based on computing a Levenshtein distance between each of the resulting strings of characters. This process may assist with edge cases where attributes are not properly extracted or where the splitting of words results in different meanings. This process may also assist in handling spell check mistakes, for example.

Second threshold check 532 performs functions similar to first threshold check 530. For example, second threshold check 532 may generate character based relevance 533 identifying whether the item identified by item ID 372 is relevant based on final similarity value 527. For example, second threshold check 532 may determine that the item is relevant when final similarity value 527 is beyond (e.g., at or above) a threshold. Otherwise, if final similarity value 527 is not beyond the threshold, second threshold check 532 may determine that the item is not relevant. In some examples, second threshold check 532 determines whether the item is relevant in accordance with equation 5. Second threshold check 532 may generate character based relevance 533 to include one value (e.g., 1) if the item is relevant, and another value (e.g., 0) if the item is not relevant.

In some examples, second threshold check 532 generates character based relevance 533 based on text similarity value 525 and character similarity value 527. For example, second threshold check 532 may determine whether any of the text similarity value 252 and the character similarity value 527 exceed a corresponding threshold. If either of the text similarity value 252 and the character similarity value 527 exceed their corresponding threshold, second threshold check 532 may generate character based relevance 533 indicating that the item is relevant (e.g., 1). If none of the text similarity and the character similarity exceed their corresponding threshold, relevance score computing device 102 generate character based relevance 533 indicating that the item is not relevant (e.g., 0).

Decision block 540 generates relevance flag 543 identifying whether the item is relevant based on feature based relevance 531 and character based relevance 533. For example, decision block 540 may generate relevance flag 543 to indicate the item is relevant if either feature based relevance 531 or character based relevance 533 indicates the item is relevant (e.g., an OR function). Otherwise, if neither feature based relevance 531 nor character based relevance 533 indicate the item is relevant, decision block 540 generates relevance flag 543 indicating that the item is not relevant. In some examples, decision block 540 may generate relevance flag 543 to indicate the item is relevant only if both feature based relevance 531 and character based relevance 533 indicate the item is relevant (e.g., an AND function). In some examples, decision block 540 applies a corresponding weight to each of feature based relevance 531 and character based relevance 533, and determines whether the item is relevant based on the weighted feature based relevance 531 and weighted character based relevance 533, such as by determining whether their sum is above a threshold.

Referring back to FIG. 4, brand relevance engine 406 generates brand relevance data 415, which may identify a brand relevance value for each of the item recommendations 307, based on brand features 405. Brand features 405 may identify a brand extracted from text data 303, and a brand of each of the item recommendations 307. Brand relevance engine 406 may determine a best "match" between the brand identified within text data 303 and the brands of the item recommendations 307. A best match may be, for example, the brand of any of the items that is most similar (compared to the brands of the other items) to the brand of text data 303.

Figure 6A:
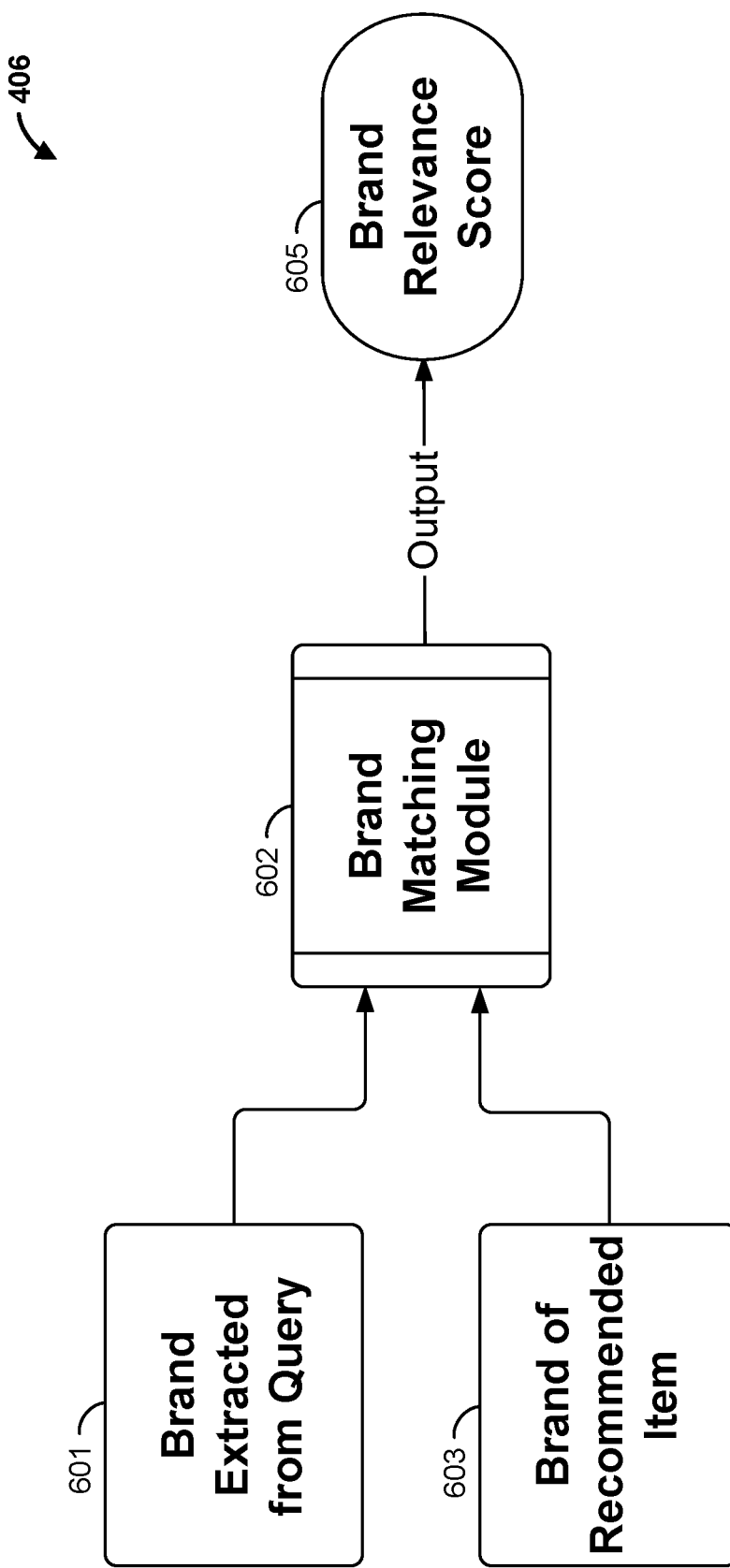
FIG. 6A is a block diagram of an example brand relevance engine in accordance with some embodiments.

FIG. 6A illustrates an example of brand relevance engine 406. In this example, brand matching module 602 receives a search query extracted brand 601, which may be a brand identified within text data 301. Brand matching module 602 also receives recommended item brand 603, which may be a brand of an item identified within item recommendations 307. Brand matching module 602 determines a similarity between search query extracted brand 601 and recommended item brand 603, and generates brand relevance score 605 identifying the similarity.

Figure 6B:
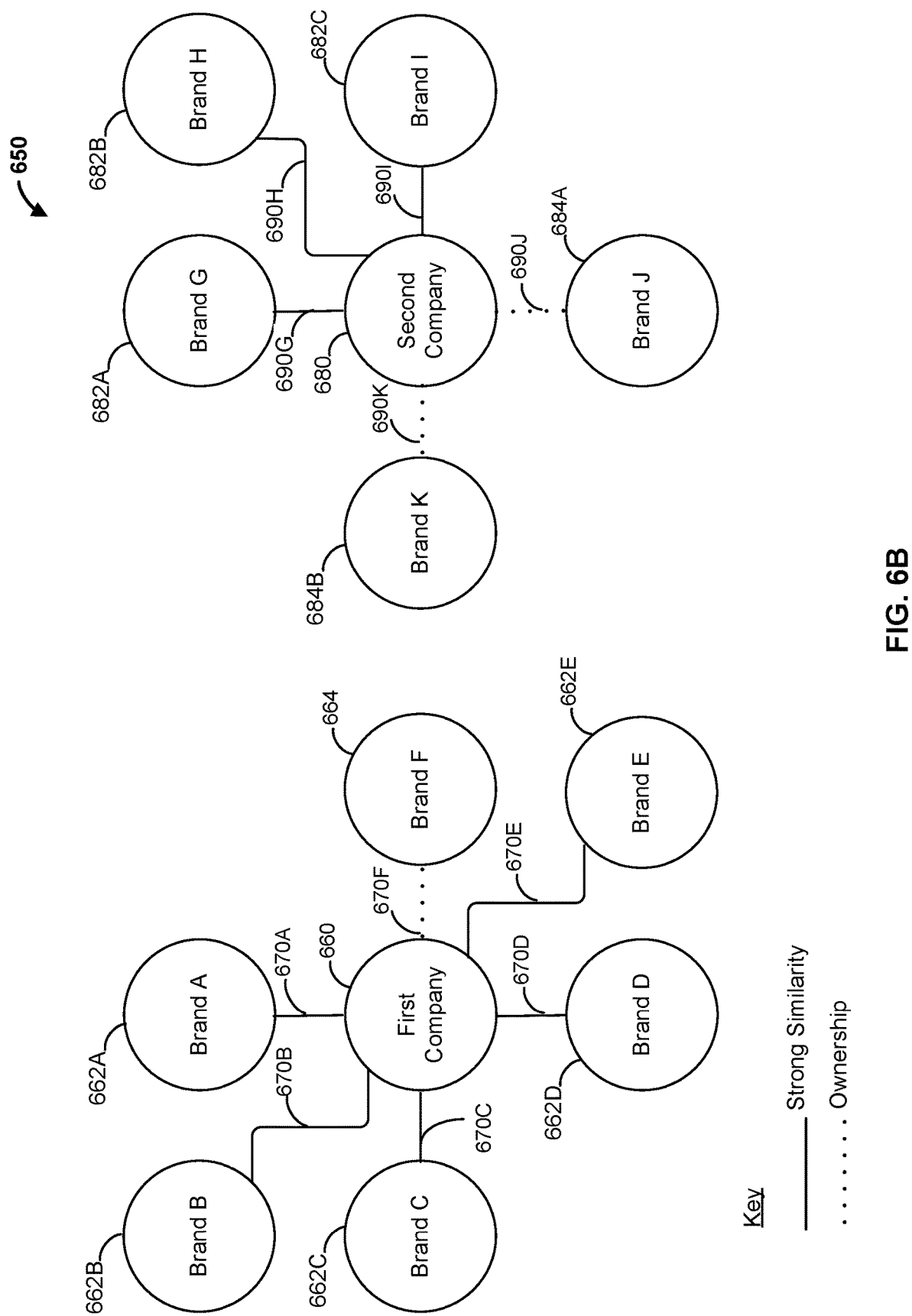
FIG. 6B is an exemplary hierarchical graph that may be employed by the brand relevance engine of FIG. 6A in accordance with some embodiments.

Brand matching module 602 may determine the similarity between search query extracted brand 601 and recommended item brand 603 based on application of a hierarchical graph. The hierarchical graph may identify relations between features of various items, such as relations between brands. FIG. 6B, for example, illustrates a brand-based hierarchical graph 650 that identifies nodes, such as first company node 660 and second company node 680, and edges between the nodes, such as edges 670A, 690G. Edges in solid lines indicate a strong similarity between the nodes, and edges in dashed lines indicate an ownership (e.g., assuming there is no strong similarity between the nodes). In this example, brand A node 662A is considered strongly similar to first company node 660, as the nodes 660, 662A are connected via an edge 670A with a solid line. For example, the name of the first company may be very similar to the name of brand A. The first company may also own brand A. Similarly, brand B node 662B, brand C node 662C, brand D 662D, and brand E node 662E may all considered strongly similar to first company node 660, as they are connected via edges 670B, 670C, 670D, 670E, respectively. Brand F node 664, however, is connected to first company node 660 via edge 670F with a dashed line, indicating that first company owns brand E, but there is no strong similarity between the name of the first company and brand E.

Similarly, brand G node 682A, brand H node 682B, and brand I node 682C may all be considered strongly similar to second company node 680, as they are connected via edges 690G, 690H, 690I, respectively. Brand J node 684A and brand K node 684B, however, are each connected to second company node 680 via edges 690J, 690K, respectively, each with a dashed line. The dashed lines indicate that second company owns brands J and K, but there is no strong similarity between the name of the second company and brand J or brand K.

In addition, there are no edges connecting, for example, first company node 660 and nodes 682A, 682B, 682C, 684A, 684B, indicating there is no brand similarity or ownership between the first company and the corresponding brands. Similarly, because there are no edges connecting second company node 680 to nodes 662A, 662B, 662C, 662D, 662E, 664, there is no brand similarity or ownership between the second company and the corresponding brands.

To generate a hierarchical graph, in some examples, an application executed by relevancy score computing device 102 may allow a user to connect nodes (e.g., brands), such as with a solid line or a dashed line. Relevancy score computing device 102 may store the hierarchical graph in database 116. In some examples, the hierarchical graph may be generated and/or updated based on determining a textual similarity between nodes. For example, relevancy score computing device 102 may determine a Levenshtein distance between nodes (e.g., between the names identified by each of the nodes), such as first company node 660 and node 662A, and may generate an edge (e.g., with a solid line) between the nodes, such as nodes 660, 662A, if the distance is below a predetermined threshold. The lesser the computed distance, the more similar the nodes are. If the distance is not below the predetermined threshold, relevancy score computing device 102 may determine if there is an ownership association between the nodes (e.g., such as between first company node 660 and brand F node 664), and generate an edge with a dashed line between the nodes if an ownership association exists. Otherwise, if the distance is not above the predetermined threshold and there is no ownership association, no edge is generated between the nodes.

In some examples, the edges may be weighted. For example, relevancy score computing device 102 may determine whether to place an edge between two nodes based on user session data 320, such as frequency of a brand added to online carts during previous sessions (e.g., aggregated among a plurality of customers). For example, given a search query extracted brand 601, the closest brand may be deemed to be the brand that is most often added to customers' online shopping carts when customers provide such a search query. For example, relevancy score computing device 102 may determine the weights in accordance with the equation below.

$$w_k = \frac{\alpha_k}{\alpha_k + \beta_k} \quad \text{(eq. 10)}$$

where:
$\alpha_k$ is frequency of brand k being added to a cart; and
$\beta_k$ is the total frequency of all other brands (except brand k) being added to the cart.

In some examples, any brands with a weight $w_k$ for a particular search query extracted brand 601 that are above a predefined threshold are deemed relevant, and an edge is placed between that brand and the search query extracted brand 601 in brand-based hierarchical graph 650. If a brand's weight $w_k$ is not above the predefined threshold, no edge is created, and thus the node is deemed not relevant to the particular search query extracted brand 601.

Referring back to FIG. 6A, brand matching module may identify a node corresponding to search query extracted brand 601, and a node corresponding to recommended item brand 603, and determine if they are connected via an edge. Based on whether the nodes are connected, brand matching module 602 generates brand relevance score 605. For example, if the nodes are not connected, brand relevance score 605 may indicate a first value (e.g., 0). If the nodes are connected by a solid like, brand relevance score 605 may indicate a second value (e.g., 1). If the nodes are connected by a dashed line, brand relevance score 605 may indicate a third value (e.g., 2). In some examples, brand matching module 602 may generate brand relevance score 605 based on a weight corresponding to the edge.

Referring back to FIG. 4, count relevance engine 408 operates on count features 407 to generate count relevance data 417, which may identify a count relevance value for each of the item recommendations 307. Count features 407 may identify, for the text data 303 and each of the item recommendations 307, a count, a pack, a number of pieces, or any other quantity. For example, feature extraction engine 402 may extract from text data 303 a count, such as "three" in "three soap bars of brand bee." Further, feature extraction engine 402 may determine, for each of the item recommendations, a count, such as a count identified within item options 380 of catalog data 310 for each item. Feature extraction engine 402 may provide the term "three," associated with the text data 303, and each of the counts for the item recommendations 307 (if any), within count features 407 to count relevance engine 408. Count relevance engine 408 may generate the count relevance value for each of the item recommendations 307 based on a similarity between the count for text data 303 and the count of each of the item recommendations 307.

Similarly, size relevance engine 410 operates on size features 404 to generate size relevance data 419, which may identify a size relevance value for each of the item recommendations. Size features 404 may identify, for the text data 303 and each of the item recommendations 307, a volume (e.g., liter, fluid ounce, ml), a length (e.g., inches, cm, foot), a mass (e.g., gram, mg, kg, pounds), a size (e.g., large, XL, XS, 5 inches×6 inches), or any other suitable size. For example, feature extraction engine 402 may extract from text data 303 a size, such as "XL" in "an XL shirt for brand bee." Further, feature extraction engine 402 may determine, for each of the item recommendations, a size, such as a size identified within item options 380 of catalog data 310 for each item. Feature extraction engine 402 may provide the term "XL," associated with the text data 303, and each of the sizes for the item recommendations 307 (if any), within size features 409 to size relevance engine 410. Size relevance engine 410 may generate the size relevance value for each of the item recommendations 307 based on a similarity between the size for text data 303 and the size of each of the item recommendations 307.

Figure 7:
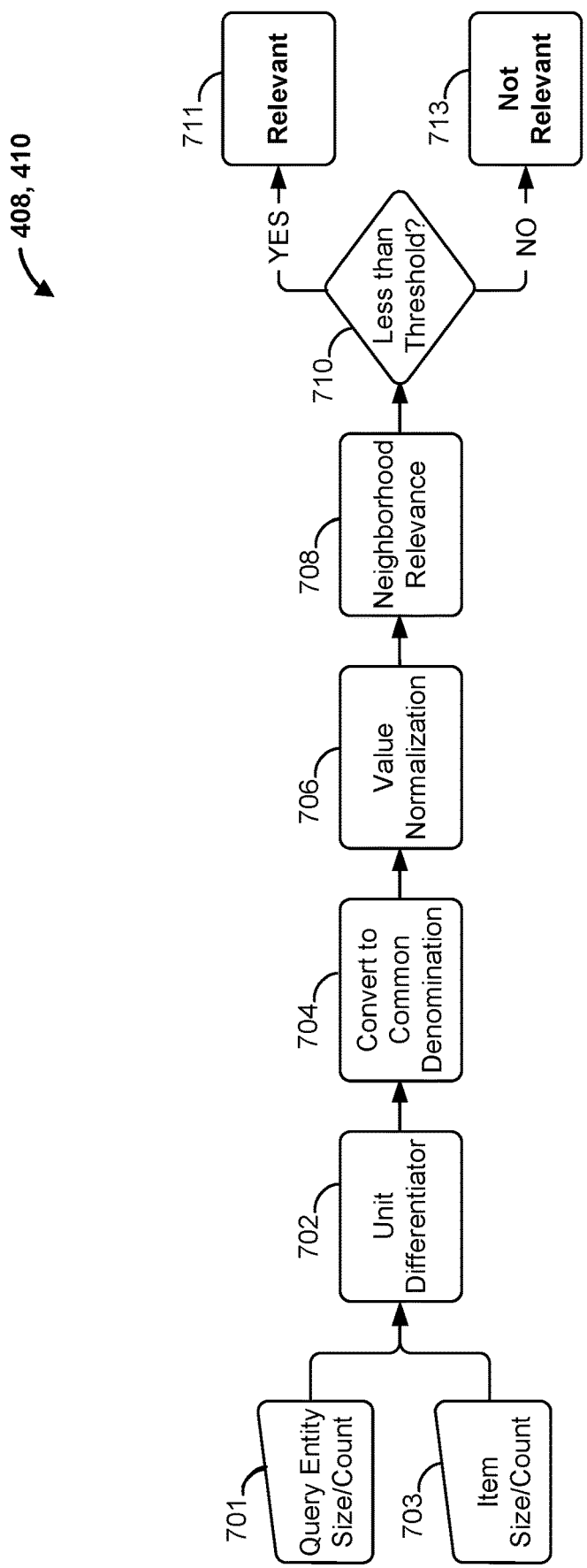
FIG. 7 is a block diagram of an example size/count relevance engine in accordance with some embodiments.

FIG. 7 illustrates an example of a count relevance engine 408 and size relevance engine 410. In this example, a unit differentiator 702 receives a query entity size/count (size or count) 701, which may be a brand identified within text data 301. Unit differentiator 702 also receives item size/count 703, which may be a size or count of an item identified within item recommendations 307. Unit differentiator 702 identifies a type of size or count within each of query entity size/count 701 and item size/count 703. The type may be, for example, a type of unit such as "fluid ounces" for volume or a type of size such as "xtra large." Convert to common denomination 704 receives the identified types, and converts the types to a same unit (e.g., when they are the same type). For example, convert to common denomination 704 may convert "liters" and "fluid ounces" to a same unit (e.g., fluid ounces), or "inches" and "foot" to a same unit (e.g., inches). Value normalization 706 may convert values associated with each unit to a same type. In some examples, value normalization 706 may convert value terms to values. For example, assuming query entity size/count 701 identified the word "half" and item size/count 703 identified term "0.7," value normalization 706 may convert "half" to "0.5."

Neighborhood relevance 708 may determine an error based on the values determined by value normalization 706. For example, neighborhood relevance 708 may determine the error by subtracting one value from the other. Threshold block 710 may compare the error to a threshold. For example, threshold block 710 may determine whether the absolute value of the error value is less than a threshold. If the absolute value of the error value is less than the threshold, the item size/count 703 is relevant to query entity size/count 701. Otherwise, if the absolute value of the error value is not less than the threshold, item size/count 703 is not relevant to query entity size/count 701. Threshold block 710 generates a relevant output 711 when item size/count 703 is determined to be relevant to query entity size/count 701, and an irrelevant output 713 when item size/count 703 is determined not to be relevant to query entity size/count 701. In the example of count relevance engine 408, count relevance engine 408 may populate count relevance data 417 with the output of threshold block 710 (e.g., relevant output 711 or irrelevant output 713). In the example of size relevance engine 410, size relevance engine 410 may populate size relevance data 419 with the output of threshold block 710 (e.g., relevant output 711 or irrelevant output 713).

Referring back to FIG. 4, product ranking engine 420 receives product relevance data 413, brand relevance data 415, count relevance data 417, and size relevance data 419. Product ranking engine 420 may populate relevance data 305 with one or more of product relevance data 413, brand relevance data 415, count relevance data 417, and size relevance data 419, and may transmit relevance data 305 (e.g., to web server 104). In some examples, product ranking engine 420 may generate a final ranking for the item based on product relevance data 413, brand relevance data 415, count relevance data 417, and size relevance data 419. For example, product ranking engine 420 may apply a corresponding weight to each of product relevance data 413, brand relevance data 415, count relevance data 417, and size relevance data 419, and may combined the weighted values to generate a final ranking value for the item. Product ranking engine 420 may populate ranked item recommendations with the final ranking value, and transmit ranked item recommendations 311 (e.g., to web server 104).

Figure 8A:
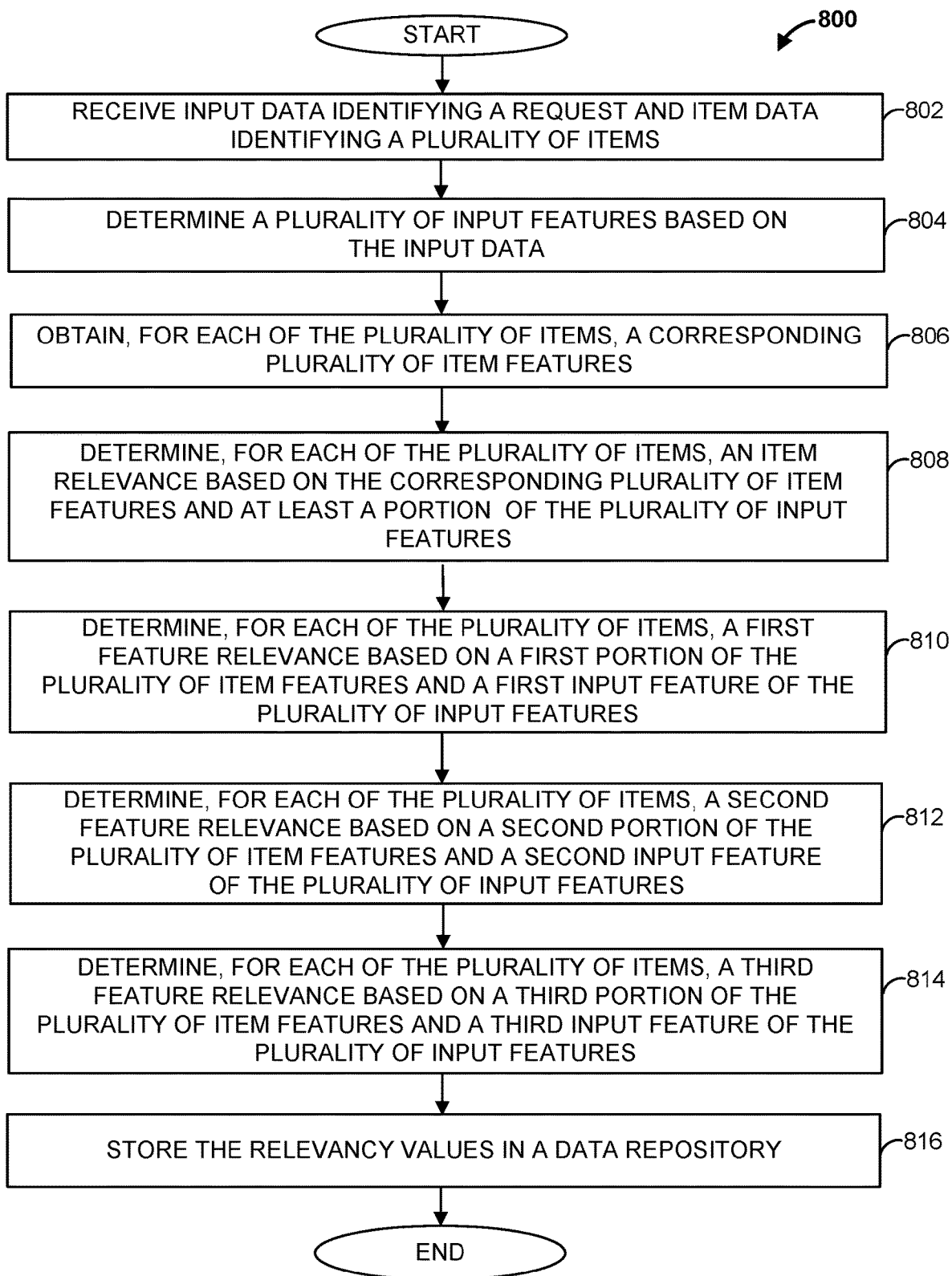
FIGS. 8A and 8B are flowcharts of example methods that can be carried out by the advertisement system of FIG. 1 in accordance with some embodiments.

FIG. 8A is a flowchart of an example method 800 that can be carried out by the advertisement system 100 of FIG. 1. Beginning at step 802, a computing device, such as relevancy score computing device 102, receives input data identifying a request (e.g., text data 303), such as a search request, and item data identifying a plurality of items (e.g., item recommendations 307). At step 804, a plurality of input features are determined based on the input data. For example, the computing device may normalize the input data and extract one or more features from the normalized input data, such as a brand, size, and a count, from text data 303. Further, at step 806, for each of the plurality of items, a corresponding plurality of item features are obtained. For example, the computing device may obtain from a database, such as from database 116, features for each of the plurality of items, such as a brand, size, and count.

Proceeding to step 808, an item relevance is determined for each of the plurality of items. The item relevance is determined based on the corresponding plurality of item features for the item and at least a portion of the plurality of input features. For example, the computing device may determine an item relevance value for each of the plurality of items in accordance with equation 4. As another example, the computing device may compute the item relevance values as described above with respect to FIG. 5.

At step 810, a first feature value is determined for each of the plurality of items. The first feature values are determined based on a first portion of the plurality of item features and a first input feature of the plurality of input features. For example, the computing device may determine a brand relevance value based on a brand identified within the input data, and a brand of each of the plurality of items.

At step 812, a second feature value is determined for each of the plurality of items. The second feature values are determined based on a second portion of the plurality of item features and a second input feature of the plurality of input features. For example, the computing device may determine a count relevance value based on a count identified within the input data, and a count of each of the plurality of items.

At step 814, a third feature value is determined for each of the plurality of items. The third feature values are determined based on a third portion of the plurality of item features and a third input feature of the plurality of input features. For example, the computing device may determine a size relevance value based on a size identified within the input data, and a size of each of the plurality of items.

Proceeding to step 816, the relevancy values generated for the plurality of items are stored in a data repository. For example, the computing device may store the relevancy values in a database, such as database 116 (e.g., ranked item recommendations 311). The method then ends.

Figure 8B:
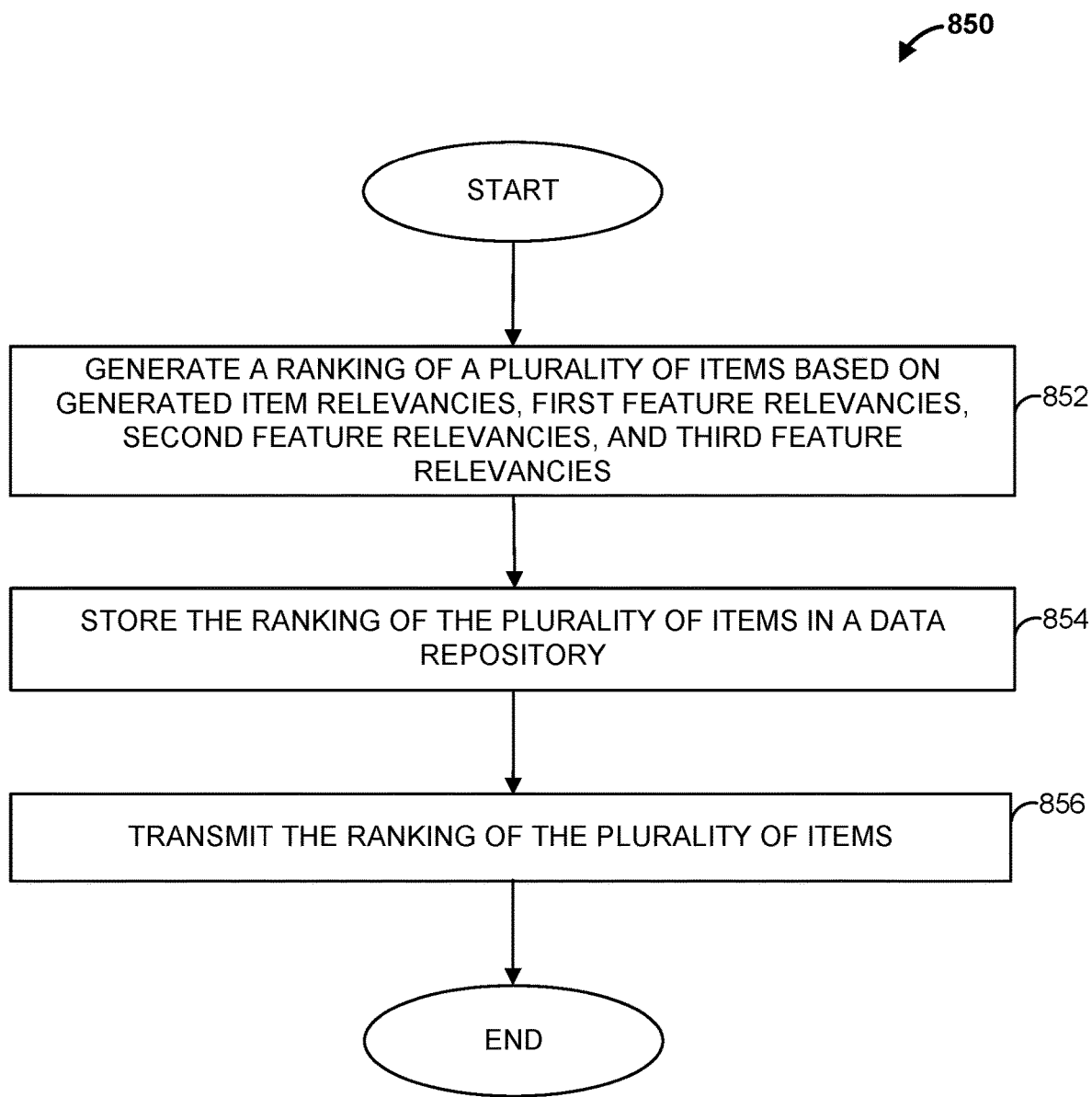

FIG. 8B is a flowchart of an example method 850 that can be carried out by the advertisement system 100 of FIG. 1. Beginning at step 852, a computing device, such as relevancy score computing device 102, generates a ranking of a plurality of items based on generated item relevancies, first feature relevancies, second feature relevancies, and third feature relevancies. The item, first feature, second feature, and third feature relevancies may correspond to those generated as described with respect to method 800 of FIG. 8A, for example.

At step 854, the ranking of the plurality of items is stored in a data repository. For example, the computing device may store the ranking in a database, such as database 116. At step 856, the raking of the plurality of items is transmitted. For example, the computing device may transmit the ranking to a web server, such as web server 104. Web server 104 may display one or more item advertisements for the plurality of items based on the ranking. The method then ends.

Figure 9:
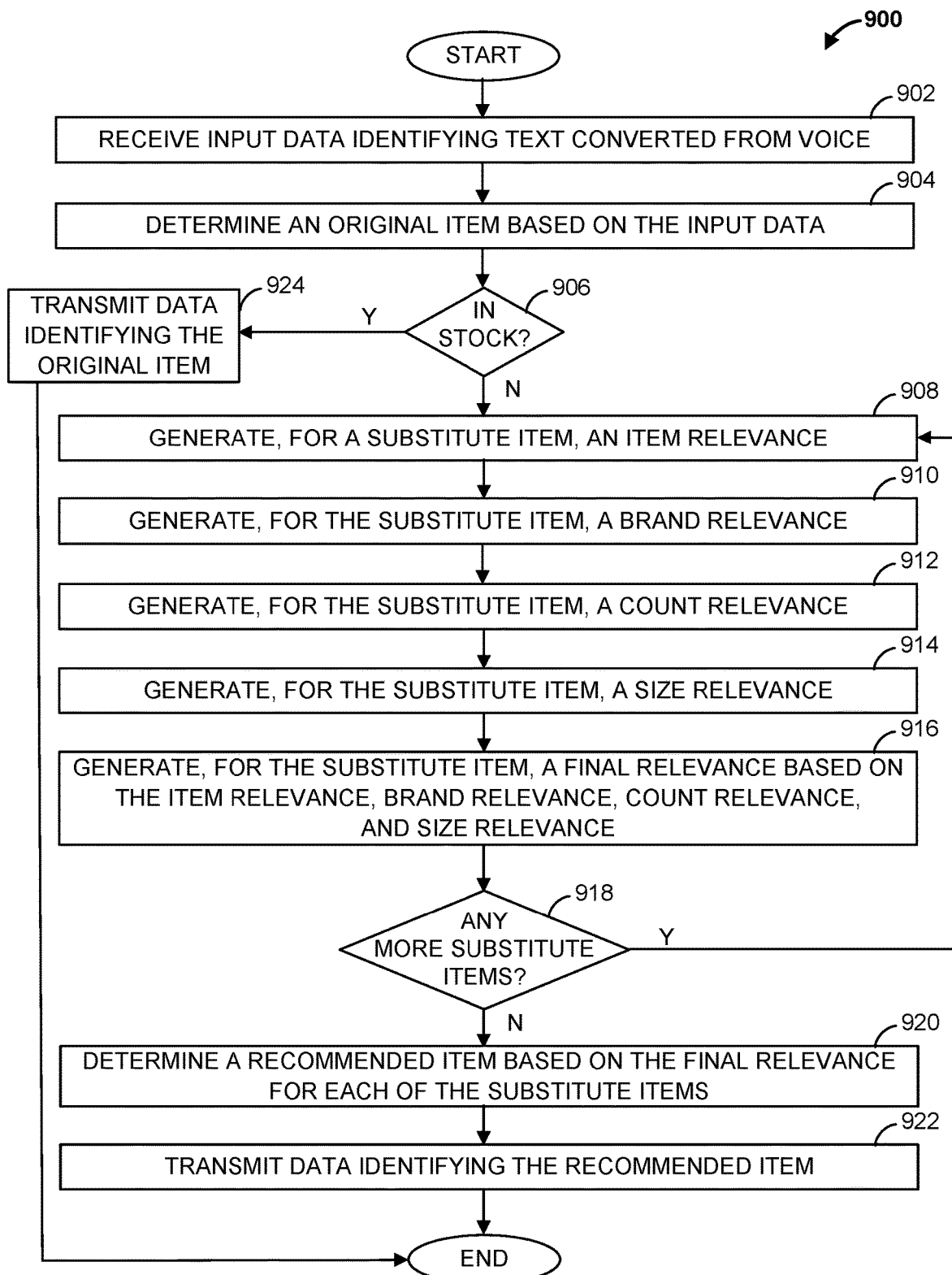
FIG. 9 is a flowchart of another example method that can be carried out by the advertisement system of FIG. 1 in accordance with some embodiments.

FIG. 9 is a flowchart of an example method 900 that can be carried out by the advertisement system 100 of FIG. 1. Beginning at step 902, a computing device, such as relevancy score computing device 102, receives input data identifying text converted from speech. For example, the computing device may receive text data 303 from a customer computing device 112, where the text data 303 identifies text generated from speech. At step 904, an original item is identified based on the input data. For example, the computing device may transmit to item recommendation system 105 the input data, and portions of user session data (e.g., user session data 320) and/or portions of user transaction data (e.g., user transaction data 340) for the customer. In response, the computing device may receive one or more ranked item recommendations. The computing device may select the highest ranked item as the original item.

At step 906, a determination is made as to whether the original item is in stock. For example, database 116 may store in stock data identifying whether an item is in stock, such as in stock at store 109, or at any location where web-based purchases may be shipped from. The computing device may determine whether the item is in stock based on the in stock data. If the item is in stock, the method proceeds to step 924, where the computing device transmits data identifying the original item. For example, the computing device may transmit the data to web server 104. Web server 104 may display an item advertisement on a website for the original item, or may add the item to the customer's online shopping cart, based on a request from the customer (e.g., as identified within the input data). The method then ends.

Back at step 906, if the original item is not in stock, the method proceeds to step 908, where an item relevance is generated for a substitute item. For example, the computing device may obtain another item received from item recommendation system 105 (e.g., the next highest ranked item), and may determine its item relevance value in accordance with equation 4. As another example, the computing device may compute the item relevance value as described above with respect to FIG. 5.

The method then proceeds to step 910, where a brand relevance is generated for the substitute item. For example, the computing device may generate a brand relevance value for the substitute item based on a brand extracted from the input data, and a brand of the substitute item. For example, the computing device may apply a hierarchical graph, such as brand hierarchical graph 650 of FIG. 6B, to the brand extracted from the input data and the brand of the substitute item.

Proceeding to step 912, the method generates, for the substitute item, a count relevance. For example, the computing device may extract a count from the input data, and may determine a count for the substitute item (e.g., based on catalog data 310). Further, the computing device may determine a count relevance value based on a similarity of the counts. For example, the computing device may execute a count relevance engine, such as the count relevance engine 408 of FIGS. 4 and 7, to determine the count relevance value for the substitute item.

The method then proceeds to step 914, where the method generates, for the substitute item, a size relevance. For example, the computing device may extract a size from the input data, and may determine a size for the substitute item (e.g., based on catalog data 310). Further, the computing device may determine a size relevance value based on a similarity of the sizes. For example, the computing device may execute a size relevance engine, such as the size relevance engine 410 of FIGS. 4 and 7, to determine the size relevance value for the substitute item.

The method then proceeds to step 916, where a final relevance is generated for the substitute item based on the item relevance, the brand relevance, the count relevance, and the size relevance. For example, the computing device may apply any suitable algorithm to the brand relevance, the count relevance, and the size relevance to generate the final relevance. As an example, the algorithm may include applying a corresponding weight to each of the item relevance, the brand relevance, the count relevance, and the size relevance, and adding the results. In some examples, each of the item relevance, the brand relevance, the count relevance, and the size relevance are normalized and then added.

Proceeding to step 918, a determination is made as to whether there are any more substitute items. For example, the computing device may determine whether any additional items were received from item recommendation system 105. If there are additional substitute items, the method proceeds back to step 908, to generate a final relevance for the additional substitute item. Otherwise, if there are no additional substitute items, the method proceeds to step 920.

At step 920, a recommended item is determined based on the final relevancies for the substitute items. For example, the computing device may select as the recommended item the substitute item with the highest final relevancy. The method then proceeds to step 922, where data identifying the recommended item is transmitted. For example, the computing device may transmit the data to web server 104. Web server 104 may display an item advertisement on the website for the recommended item, or may add the item to the customer's online shopping cart, based on the customer's request. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
   a computing device configured to:
   receive a search query submitted by a user accessing a web site;
   determine a requested item feature based on the search query;
   perform text normalization on the requested item feature;
   obtain, for each of a plurality of recommended items, a plurality of recommended item features;
   perform text normalization on the plurality of recommended item features;
   compare the text normalized requested item feature to a corresponding text normalized recommended item feature of the plurality of recommended item features to generate a comparison;
   generate a ranked list of recommended items based on the comparison, the ranked list including a ranking of the plurality of recommended items; and
   transmit the ranked list of recommended items to be displayed to the user in response to the search query.

2. The system of claim 1, wherein the computing device is further configured to:
   generate a plurality of relevancy values based on the comparison, the relevancy values based on a determined similarity value associated with the comparison;
   transmit the plurality of relevancy values to a web server; and
   determine an item advertisement for at least one item of the plurality of recommended items based on the plurality of relevancy values and displays the item advertisement to the user.

3. The system of claim 2, wherein the computing device is configured to:
   determine, for each of the plurality of recommended items, a final relevancy value based on a corresponding plurality of relevancy values; and
   store the final relevancy values in a data repository.

4. The system of claim 2, wherein determining, for each of the plurality of recommended items, the plurality of relevancy values further comprises:
   applying a weight to each of the similarity values.

5. The system of claim 2, wherein determining, for each of the plurality of recommended items, the plurality of relevancy values further comprises generating an item relevance value, a brand relevance value, a count relevance value, and a size relevance value.

6. The system of claim 5, wherein the computing device is configured to generate the brand relevance value based on a hierarchical graph stored in a data repository.

7. The system of claim 6, wherein the hierarchal graph contains a plurality of nodes and at least one edge connecting the plurality of nodes and the brand relevancy value between is further determined based on an edge connecting two nodes.

8. The system of claim 5, wherein determining the requested item feature based on the search query comprises determining a requested title feature, wherein the plurality of recommended item features comprise an item title feature, and wherein generating the item relevance value comprises determining a first similarity value based on the requested title feature and the item title feature corresponding to the recommended item.

9. The system of claim 8, wherein generating the item relevance value comprises:
   determining a second similarity value between each of the plurality of recommended item features and the requested item feature;
   applying a weight to each of the second similarity values; and
   determining a third similarity value based on the weighted second similarity values.

10. The system of claim 5, wherein generating at least one of the count relevance value and the size relevance value comprises determining a neighborhood relevance between the corresponding item feature and the at least one item feature.

11. A method comprising:
  receiving a search query submitted by a user accessing a website;
  determining a requested item feature based on the search query;
  performing text normalization on the requested item feature;
  obtaining, for each of a plurality of recommended items, a plurality of recommended item features;
  performing text normalization on the plurality of recommended item features;
  comparing the text normalized one requested item feature to the text normalized recommended item feature of the plurality of recommended item features to generate a comparison;
  generate a ranked list of recommended items based on the comparison, the ranked list including a ranking of the plurality of recommended items; and
  transmitting the ranked list of recommended items to be displayed to the user in response to the search query.

12. The method of claim 11 comprising:
  generating a plurality of relevancy values based on the comparison, the relevancy values based on a determined similarity value associated with the comparison;
  determining, for each of the plurality of recommended items, a final relevancy value based on a corresponding plurality of relevancy values; and
  storing the final relevancy values in a data repository.

13. The method of claim 12, wherein determining, for each of the plurality of recommended items, the plurality of relevancy values further comprises:
  applying a weight to each of the similarity values.

14. The method of claim 12, wherein determining, for each of the plurality of recommended items, the plurality of relevancy values further comprises generating an item relevance value, a brand relevance value, a count relevance value, and a size relevance value.

15. A non-transitory computer readable medium having instructions stored thereon, wherein the instructions, when executed by at least one processor, cause a device to perform operations comprising:
  receiving a search query submitted by a user accessing a website;
  determining a requested item feature based on the search query;
  performing text normalization on the requested item feature;
  obtaining, for each of a plurality of recommended items, a plurality of recommended item features;
  performing text normalization on the plurality of recommended item features;
  comparing the text normalized requested item feature to the text normalized recommended item feature of the plurality of recommended item features to generate a comparison;
  generate a ranked list of recommended items based on the comparison, the ranked list including a ranking of the plurality of recommended items; and
  transmitting the ranked list of recommended items to be displayed to the user in response to the search query.

16. The non-transitory computer readable medium of claim 15, further comprising instructions stored thereon that, when executed by at least one processor, further cause the device to perform operations comprising:
  generating a plurality of relevancy values based on the comparison; and
  transmitting the plurality of relevancy values to a web server, wherein the web server determines an item advertisement for at least one item of the plurality of recommended items based on the plurality of relevancy values and displays the item advertisement to the user.

17. The non-transitory computer readable medium of claim 15, further comprising instructions stored thereon that, when executed by at least one processor, further cause the device to perform operations comprising:
  generating a plurality of relevancy values based on the comparison, the relevancy values based on a determined similarity value associated with the comparison;
  determining, for each of the plurality of recommended items, a final relevancy value based on a corresponding plurality of relevancy values; and
  storing the final relevancy values in a data repository.

18. The non-transitory computer readable medium of claim 17, further comprising instructions stored thereon that, when executed by at least one processor, further cause the device to perform operations comprising:
  generating an item relevance value, a brand relevance value, a count relevance value, and a size relevance value; and
  applying a weight to each of the similarity values.

19. The non-transitory computer readable medium of claim 17, further comprising instructions stored thereon that, when executed by at least one processor, further cause the device to perform operations comprising generating an item relevance value, a brand relevance value, a count relevance value, and a size relevance value.

20. The non-transitory computer readable medium of claim 17, wherein the instructions, when executed by the at least one processor, cause the device to further perform operations comprising:
  determining a requested item based on the search query;
  determining if the requested item is in stock; and
  if the requested item is not in stock:
    determining at least one substitute item,
    generating, for each of the at least one substitute item, a final relevance value based on at least one of an item relevance, brand relevance, count relevance, or size relevance, and
    substituting one of the at least one substitute item for the requested item based on the final relevance value.

* * * * *